(12) United States Patent
Ishizaki et al.

(10) Patent No.: US 10,386,984 B2
(45) Date of Patent: Aug. 20, 2019

(54) DISPLAY UNIT WITH TOUCH DETECTION FUNCTION, AND ELECTRONIC DEVICE

(71) Applicant: Japan Display Inc., Tokyo (JP)

(72) Inventors: Koji Ishizaki, Tokyo (JP); Koji Noguchi, Kanagawa (JP); Takayuki Nakanishi, Kanagawa (JP); Yasuyuki Matsui, Kanagawa (JP); Masanobu Ikeda, Aichi (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/183,030

(22) Filed: Nov. 7, 2018

(65) Prior Publication Data

US 2019/0073066 A1 Mar. 7, 2019

Related U.S. Application Data

(63) Continuation of application No. 15/435,011, filed on Feb. 16, 2017, now Pat. No. 10,162,470, which is a (Continued)

(30) Foreign Application Priority Data

Aug. 19, 2010 (JP) .................. 2010-184304

(51) Int. Cl.
*G06F 3/047* (2006.01)
*G09G 5/00* (2006.01)
(Continued)

(52) U.S. Cl.
CPC .......... *G06F 3/047* (2013.01); *G02F 1/13338* (2013.01); *G06F 3/044* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,550,659 | A | 8/1996 | Fujieda et al. |
| 8,319,737 | B2 | 11/2012 | Noguchi et al. |

(Continued)

FOREIGN PATENT DOCUMENTS

| | | |
|---|---|---|
| CN | 101571781 | 11/2009 |
| JP | 2653014 | 9/1997 |

(Continued)

OTHER PUBLICATIONS

Chinese Office Examination Report issued in connection with related Chinese Patent Application No. CN 201110228965.2 dated Feb. 6, 2015 with English translation.

(Continued)

*Primary Examiner* — Robin J Mishler
(74) *Attorney, Agent, or Firm* — Dentons US LLP

(57) ABSTRACT

A display unit with a touch detection function including: a plurality of touch detection electrodes arranged side by side to extend in a direction, each of the touch detection electrodes being formed in a predetermined electrode pattern including electrode portion and opening portion and outputting a detection signal, based on a variation in capacitance due to an external proximity object; and a plurality of display elements formed in a layer different from a layer of the touch detection electrodes, a predetermined number of the display elements being arranged within a width dimension of a region corresponding to each of the touch detection electrodes. The predetermined electrode pattern corresponds to a layout pattern of the display elements.

14 Claims, 20 Drawing Sheets

Related U.S. Application Data continuation of application No. 14/808,700, filed on Jul. 24, 2015, now Pat. No. 9,619,098, which is a continuation of application No. 13/208,952, filed on Aug. 12, 2011, now Pat. No. 9,122,359.

(51) Int. Cl.
| | | |
|---|---|---|
| *G09G 5/02* | (2006.01) | |
| *G02F 1/1333* | (2006.01) | |
| *G06F 3/041* | (2006.01) | |
| *G06F 3/044* | (2006.01) | |
| *G02F 1/1345* | (2006.01) | |

(52) U.S. Cl.
CPC .......... *G06F 3/0412* (2013.01); *G06F 3/0416* (2013.01); *G09G 5/003* (2013.01); *G09G 5/02* (2013.01); *G02F 1/1345* (2013.01); *G09G 2300/0426* (2013.01)

(56) References Cited

U.S. PATENT DOCUMENTS

| | | |
|---|---|---|
| 2007/0069620 A1 | 3/2007 | Chou et al. |
| 2009/0096760 A1* | 4/2009 | Ma ................ G02F 1/13338 345/174 |
| 2009/0273572 A1 | 11/2009 | Edwards et al. |
| 2010/0079691 A1 | 4/2010 | Yoshii |
| 2010/0225612 A1 | 9/2010 | Ishizaki et al. |
| 2011/0175846 A1* | 7/2011 | Wang ................ G06F 3/0412 345/174 |

FOREIGN PATENT DOCUMENTS

| | | |
|---|---|---|
| JP | 2008-129708 | 6/2008 |
| JP | 2009-258182 | 11/2009 |
| JP | 2009-271923 | 11/2009 |
| TW | 200944877 | 11/2009 |

OTHER PUBLICATIONS

Taiwanese Examination Report issued in connection with related Taiwan Patent Application No. 100125008 dated Apr. 16, 2014.

Japanese Office Examination Report issued in connection with related Japanese Patent Application No. 2010-184304 dated Dec. 3, 2013.

* cited by examiner

DISPLAY UNIT WITH TOUCH DETECTION FUNCTION, AND ELECTRONIC DEVICE

RELATED APPLICATION DATA

This application is a continuation of U.S. patent application Ser. No. 15/435,011 filed Feb. 16, 2017, which is a continuation of U.S. patent application Ser. No. 14/808,700 filed Jul. 24, 2015, now U.S. Pat. No. 9,619,098 issued Apr. 11, 2017, which is a continuation of U.S. patent application Ser. No. 13/208,952 filed Aug. 12, 2011, now U.S. Pat. No. 9,122,359 issued Sep. 1, 2015, the entireties of which are incorporated herein by reference to the extent permitted by law. The present application claims the benefit of priority to Japanese Patent Application No. JP 2010-184304 filed on Aug. 19, 2010 in the Japan Patent Office, the entirety of which is incorporated by reference herein to the extent permitted by law.

BACKGROUND

The present disclosure relates to a display unit having a touch detection function, and particularly relates to a display unit with a touch detection function which detects a touch based on a change in capacitance due to an external proximity object, and an electronic device having such a display unit with the touch detection function.

In recent years, attention has been given to such a display unit configured by mounting a contact sensing device, a so-called touch panel, on a display unit such as a liquid crystal display or the like, or integrating the touch panel and the display unit, thereby causing the display unit to display various button images and the like to enable information input, in place of ordinary mechanical buttons. The display unit having such a touch panel is allowed not to have an input device such as a keyboard, a mouse, or a keypad and therefore, there is a growing trend to use the display unit in a portable information terminal such as a portable telephone, in addition to a computer.

There are some touch detection systems, and one of them is capacitance. For example, Japanese Unexamined Patent Application Publication No. 2008-129708 discloses a touch panel having X-direction electrodes and Y-direction electrodes disposed opposite to the X-direction electrodes, and detects a touch by using the fact that capacitance formed at their intersections is changed by an external proximity object. These electrodes are formed by using a translucent material, and, for example, mounting this touch panel on a display unit enables a user to carry out an input operation while viewing a display screen.

SUMMARY

Incidentally, even when an electrode is formed using a translucent material, light entering the electrode is weakened according to its transmittance to some extent, and then emitted. Therefore, in a case where a touch panel is mounted on a display unit, luminance in a part where an electrode for touch detection is disposed decreases as compared to a part where no electrode is disposed and thus, the luminance of the display unit becomes nonuniform. In particular, in a case where an electrode is formed using ITO (Indium Tin Oxide), there is a possibility that when a film thickness is made large to lower the resistance of the electrode, or when crystallization is insufficient in a manufacturing process, the transmittance might decrease, or a color or hue might not become neutral, and thereby a difference in this luminance might become conspicuous, degrading image quality. Further, there is a possibility that when the luminance is different for each of three colors (R, G, and B) of a display pixel, a shift in chromaticity might occur.

In view of the foregoing, it is desirable to provide a display unit with a touch detection function and an electronic device with the display unit, in which degradation in image quality caused by light transmittance in an electrode for touch detection may be reduced.

According to an embodiment of the present disclosure, there is provided a display unit including: a plurality of touch detection electrodes arranged side by side to extend in a direction, each of the touch detection electrodes being formed in a predetermined electrode pattern including electrode portion and opening portion and outputting a detection signal, based on a variation in capacitance due to an external proximity object; and a plurality of display elements formed in a layer different from a layer of the touch detection electrodes, a predetermined number of the display elements being arranged within a width dimension of a region corresponding to each of the touch detection electrodes. The predetermined electrode pattern corresponds to a layout pattern of the display elements.

According to an embodiment of the present disclosure, there is provided an electronic device provided with the above-described display unit with the touch detection function. For example, a television device, a digital camera, a laptop computer, a video camera, or a portable terminal device such as a portable telephone corresponds to this electronic device.

In the display unit with the touch detection function and the electronic device according to the embodiments of the present disclosure, when the display elements perform display, light is emitted through the layer where the touch detection electrodes having the predetermined electrode pattern corresponding to the layout pattern of the display elements are disposed. At this time, in a region corresponding to each display element, a similar electrode pattern is formed and thus, the distribution of luminance decline at the time when the display elements as a whole are viewed is further uniformed.

The display unit with the touch detection function according to the embodiments of the present disclosure may have, for example, a signal line allowing a pixel signal to be transmitted to the display element, and a part of the electrode portion may be arranged in a region corresponding to the signal line. In this case, for example, a selection line used to select the display element which is a target of display operation may be further provided, and a remaining part of the electrode portion may be provided in a region corresponding to the selection line. Further, the electrode portion may be provided, for example, in a region corresponding to a border between the display elements adjacent to each other.

For example, the display elements form display pixels each including three kinds of color sub-elements configured of red sub-element, a green sub-element, and a blue sub-element, and the electrode portion may be provided at least in a region corresponding to a color sub-element for a selected one of red light, green light and blue light, the selected one exhibiting highest transmittance for the electrode portion. In this case, the electrode portion may be provided, for example, at least in a region corresponding to the red sub-element. Further, for example, the electrode portion may be further provided in a region corresponding to the green sub-element as well. Furthermore, for example, the electrode portion and the opening portion may be provided in a region corresponding to the blue display element. In this case, it is preferable that the opening portion be provided, for example, substantially at a center of the blue display element, the center representing a position in a direction along which the red sub-element, the green sub-element, and the blue sub-element are arrayed.

For example, preferably, a plurality of dummy electrodes are disposed in a region between the plurality of touch detection electrodes, each of the dummy electrodes are formed in a predetermined dummy electrode pattern including electrode portion and opening portion, and the dummy electrode pattern corresponds to a layout pattern of the display elements.

For example, a plurality of drive electrodes arranged side by side to extend in a direction intersecting the touch detection electrodes may be provided, and the capacitance may be formed at each of intersections of the touch detection electrodes and the drive electrodes.

For example, the display element may include a liquid crystal layer, and a pixel electrode disposed to face the drive electrode across the liquid crystal layer, thereby allowing the liquid crystal layer to be interposed between the pixel electrode and the drive electrode. Further, the display element may include a liquid crystal layer, and a pixel electrode formed between the liquid crystal layer and the drive electrode.

According to the display unit with the touch detection function and the electronic device in the embodiments of the present disclosure, the electrode pattern of the touch detection electrodes are provided to correspond to the layout pattern of the display elements and thus, it is possible to reduce degradation in image quality caused by light transmittance in the touch detection electrode.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF EMBODIMENTS

Embodiments of the present disclosure will be described below in detail with reference to the drawings. The description will be provided in the following order.
1. Basic Principle of Capacitance Touch Detection
2. First Embodiment
3. Second Embodiment 4. Third Embodiment
5. Application Examples (1. Basic Principle of Capacitance Touch Detection)

At first, with reference to FIG. 1 to FIG. 3, there will be described a basic principle of touch detection in a display unit with a touch detection function according to an embodiment of the present disclosure. This touch detection system is embodied as a capacitance touch sensor, and forms a capacitive element by using, as illustrated in, for example, Part (A) of FIG. 1, a pair of opposed electrodes (a drive electrode E1 and a touch detection electrode E2) between which a dielectric D is interposed. This structure is expressed as an equivalent circuit illustrated in Part (B) of FIG. 1. A capacitive element C1 is configured by using the drive electrode E1, the touch detection electrode E2, and the dielectric D. Of the capacitive element C1, one end is connected to an AC-signal source (drive signal source) S, and the other end P is grounded via a resistor R and also connected to a voltage detector (touch detecting section) DET. When an AC rectangular wave Sg (Part (B) of FIG. 3) of a predetermined frequency (for example, around several kHz to tens of kHz) is applied to the drive electrode E1 (the one end of the capacitive element C1) from the AC-signal source S, an output waveform (a touch detection signal Vdet) as illustrated in Part (A) of FIG. 3 appears in the touch detection electrode E2 (the other end P of the capacitive element C1). It is to be noted that this AC rectangular wave Sg is equivalent to a driving signal Vcom to be described later.

Figure 1:
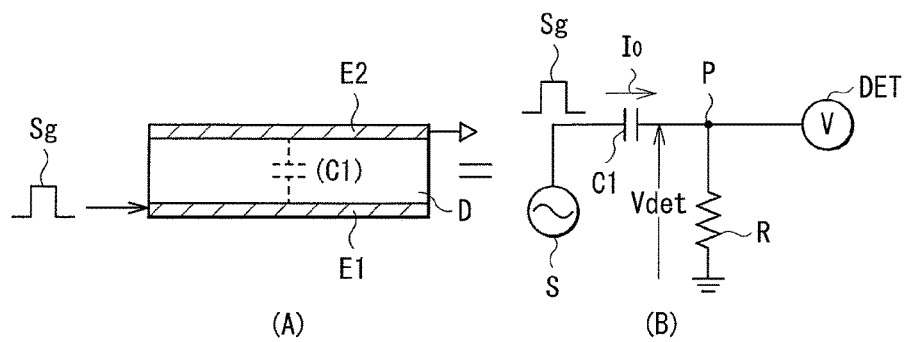
FIG. 1 is a diagram for explaining a basic principle of a touch detection system in a display device with a touch detection function according to an embodiment of the present disclosure, and illustrate a state in which there is no touch or approach of a finger.

In a state in which there is no touch (or approach) of a finger, an electric current I0 according to a capacitance value of the capacitive element C1 flows as illustrated in FIG. 1, accompanying charge and discharge for the capacitive element C1. An electric potential waveform at the other end P of the capacitive element C1 at this moment is, for example, like a waveform V0 in Part (A) of FIG. 3, and this is detected by the voltage detector DET.

Figure 2:
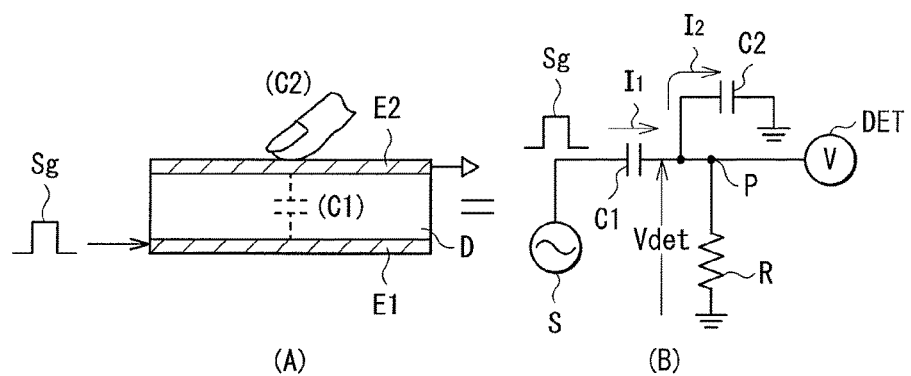
FIG. 2 is a diagram for explaining the basic principle of the touch detection system in the display device with the touch detection function according to the embodiment of the present disclosure, and illustrate a state in which there is a touch or an approach of the finger.
Figure 3:
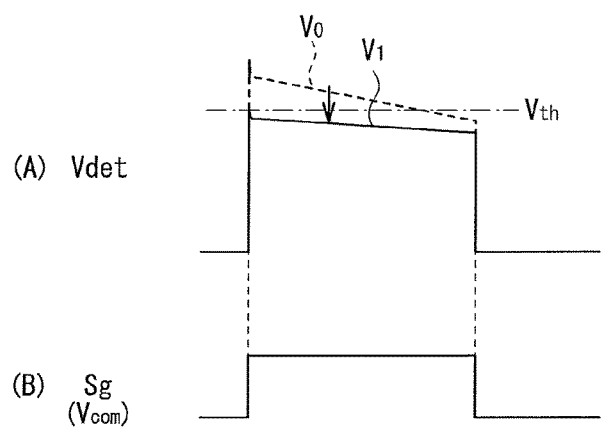
FIG. 3 is a diagram for explaining the basic principle of the touch detection system in the display device with the touch detection function according to the embodiment of the present disclosure, and illustrate an example of a waveform of a driving signal and an example of a waveform of a touch detection signal.

On the other hand, in a state in which there is a touch (or an approach) of a finger, a capacitive element C2 formed by the finger takes a shape of being added to the capacitive element C1 in series as illustrated in FIG. 2. In this state, currents I1 and I2 flow, accompanying charge and discharge for the capacitive elements C1 and C2, respectively. An electric potential waveform at the other end P of the capacitive element C1 at this moment is, for example, like a waveform V1 in Part (A) of FIG. 3, and this is detected by the voltage detector DET. At the time, the electric potential of the point P is a partial pressure potential to be determined by the values of the currents I1 and I2 flowing through the capacitive elements C1 and C2. For this reason, the waveform V1 is a value smaller than the waveform V0 in a noncontact state. The voltage detector DET compares the detected voltage with a certain threshold voltage Vth, and determines that a noncontact state is established when the detected voltage is equal to or larger than this threshold voltage Vth, and on the other hand, determines that the contact state is established when the detected voltage is lower than this threshold voltage Vth. In this way, the touch detection is enabled.

(2. First Embodiment)

[Example of Configuration]
[Example of Overall Configuration]

Figure 4:
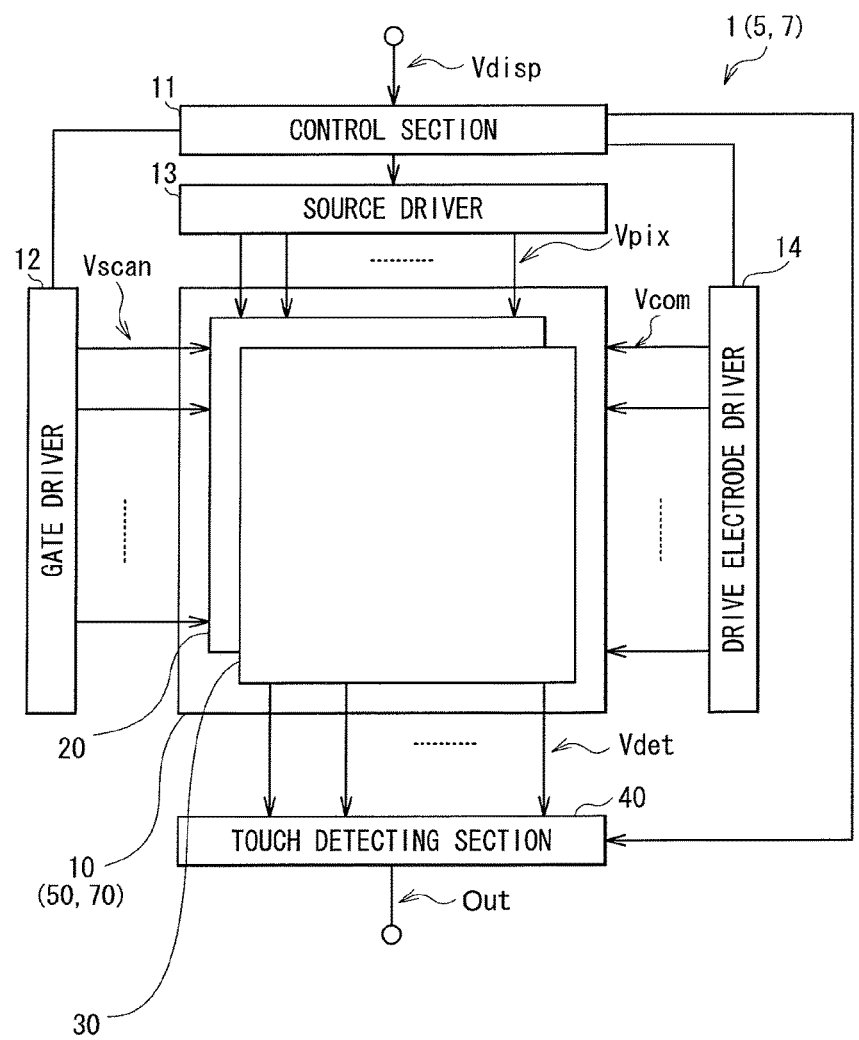
FIG. 4 is a block diagram illustrating a configurational example of a display device with a touch detection function according to an embodiment of the present disclosure.

FIG. 4 illustrates a configurational example of a display unit with a touch detection function according to the first embodiment of the present disclosure. This display unit with the touch detection function is of a so-called in-cell type, in which a liquid crystal element is used as a display element, and a liquid crystal display device configured by using the liquid crystal element and a capacitance touch detection device are integrated.

The display unit 1 with the touch detection function includes a control section 11, a gate driver 12, a source driver 13, a drive electrode driver 14, a display device 10 with a touch detection function, and a touch detecting section 40.

The control section 11 is a circuit that supplies a control signal to each of the gate driver 12, the source driver 13, the drive electrode driver 14, and the touch detecting section 40, based on an image signal Vdisp supplied externally, thereby performing control so that these elements operate in synchronization with one other.

The gate driver 12 has a function to sequentially select one horizontal line targeted for display driving of the display device 10 with the touch detection function, based on the control signal supplied from the control section 11. Specifically, as will be described later, the gate driver 12 applies a scanning signal Vscan to a gate of a TFT element Tr of a pixel Pix via a scanning signal line GCL, thereby sequentially selecting one row (one horizontal line) of the pixels Pix formed in a matrix in a liquid-crystal display device 20 of the display device 10 with the touch detection function, as a target for the display driving.

The source driver 13 is a circuit that supplies a pixel signal Vpix to each of the pixels Pix (to be described later) of the display device 10 with the touch detection function, based on the control signal supplied from the control section 11. Specifically, as will be described later, the source driver 13 supplies, via a pixel signal line SGL, the pixel signal Vpix to each of the pixels Pix forming one horizontal line sequentially selected by the gate driver 12. In these pixels Pix, display of one horizontal line is performed according to the supplied pixel signal Vpix.

The drive electrode driver 14 is a circuit that supplies the driving signal Vcom to a drive electrode COML (to be described later) of the display device 10 with the touch detection function, based on the control signal supplied from the control section 11. Specifically, the drive electrode driver 14 applies the driving signal Vcom sequentially to the drive electrode COML in a time sharing manner. A touch detection device 30 is configured to output, from a plurality of touch detection electrodes TDL (to be described later), a touch detection signal Vdet based on the driving signal Vcom, and supplies the outputted signal to the touch detecting section 40.

The display device 10 with the touch detection function is a display device with the built-in touch detection function. The display device 10 with the touch detection function has the liquid-crystal display device 20 and the touch detection device 30. The liquid-crystal display device 20 is, as will be described later, a device that performs display by sequentially scanning the horizontal lines one by one, according to the scanning signals Vscan supplied from the gate driver 12. The touch detection device 30 operates based on the above-described basic principle of the capacitance touch detection, and outputs the touch detection signal Vdet. The touch detection device 30 is, as will be described later, configured to perform sequential scanning according to the driving signals Vcom supplied from the drive electrode driver 14, and thereby performing the touch detection.

The touch detecting section 40 is a circuit that detects the presence or absence of a touch on the touch detection device 30, based on the control signal supplied from the control section 11 and the touch detection signal Vdet supplied from the touch detection device 30 of the display device 10 with the touch detection function. When there is a touch, the touch detecting section 40 determines its coordinates or the like in a touch detection region, and outputs the determined coordinates or the like as an output signal Out.

[Display Device 10 with the Touch Detection Function]

Next, a configurational example of the display device 10 with the touch detection function will be described in detail.

Figure 5:
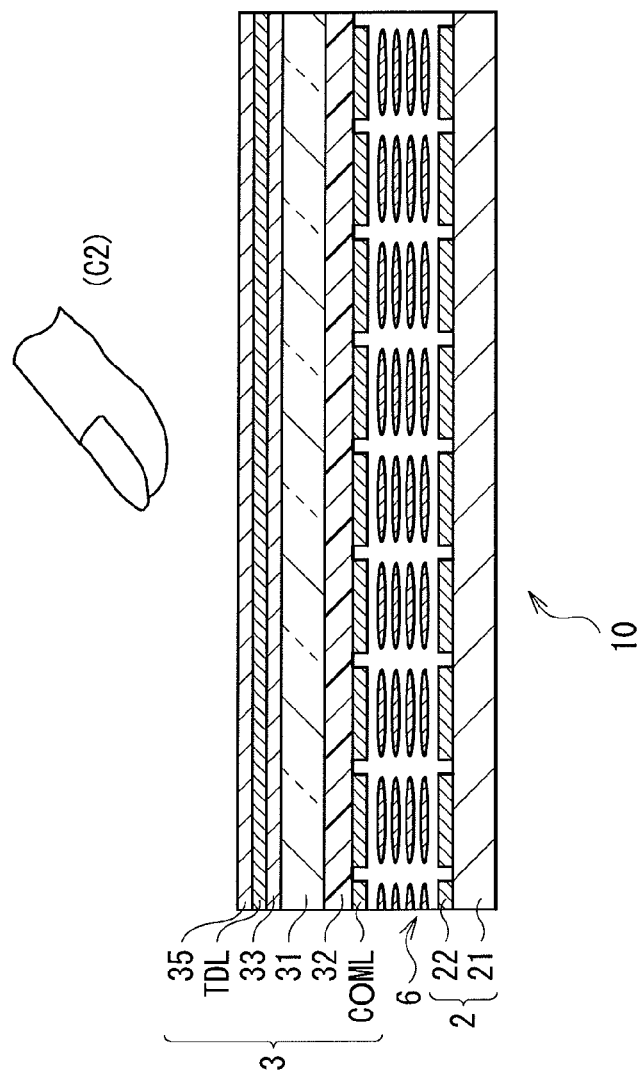
FIG. 5 is a cross-sectional diagram illustrating a schematic sectional structure of the display device with the touch detection function according to the embodiment.

FIG. 5 illustrates an example of a sectional structure of a main part in the display device 10 with the touch detection function. The display device 10 with the touch detection function includes a pixel substrate 2, an opposite substrate 3 disposed opposite the pixel substrate 2, and a liquid crystal layer 6 interposed between the pixel substrate 2 and the opposite substrate 3.

The pixel substrate 2 has a TFT substrate 21 serving as a circuit board, and a plurality of pixel electrodes 22 disposed on the TFT substrate 21 in the form of a matrix. Although not illustrated, a Thin Film Transistor (TFT) of each pixel, and wirings such as the pixel signal line SGL that supplies each of the pixel electrodes 22 with the pixel signal Vpix and the scanning signal line GCL that drives each of the TFTs, are formed on the TFT substrate 21.

The opposite substrate 3 has a glass substrate 31, a color filter 32 formed on one surface of this glass substrate 31, and the drive electrodes COML formed on this color filter 32. The color filter 32 is configured, for example, by periodically arranging color filter layers of three colors of red (R), green (G), and blue (B), and one set of the three colors of R, G, and B corresponds to each display pixel. The drive electrode COML functions as a common drive electrode of the liquid-crystal display device 20 and also functions as a drive electrode of the touch detection device 30. It is to be noted that in this example, the drive electrode is shared by the display and the touch detection, but the drive electrode may be provided as each of separate elements. The drive electrode COML is coupled to the TFT substrate 21 by a contact conductive pillar not illustrated, and the driving signal Vcom in AC rectangular waveform is applied to the drive electrode COML from the TFT substrate 21 through this contact conductive pillar. A translucent layer 33 is formed on the other surface of the glass substrate 31, and the touch detection electrode TDL that is a detection electrode of the touch detection device 30 is formed thereon. The touch detection electrode TDL is configured, for example, by using ITO (Indium Tin Oxide), IZO, SnO, or the like, and is a translucent electrode. The touch detection electrode TDL has a plurality of openings as will be described later. The translucent layer 33 is made of, for example, an insulating material such as SiN and SiC, and a refractive index of the translucent layer 33 is a value (for example, around 1.75 in SiN, and 1.6 in SiC) between a refractive index (for example, around 1.5) of the glass substrate 31 and a refractive index (for example, around 1.8) of the touch detection electrode TDL, around a wavelength 550 nm with high visibility. This translucent layer 33 is provided as an index matching layer to reduce reflection between the glass substrate 31 and the touch detection electrode TDL. Further, on this touch detection electrode TDL, a polarizing plate 35 is disposed.

As will be described later, it is desirable to make the glass substrate 31 thin to reduce a change in image quality depending on an angle at which a user views. Specifically, a thickness of 0.3 mm or less is preferable, and 0.2 mm or less is further preferable.

The liquid crystal layer 6 is a layer that modulates light passing therethrough, according to the state of an electric field, and in which, for example, a liquid crystal of any of various modes such as TN (Nematic Twisted), VA (Vertical Alignment), and ECB (Electrically Controlled Birefringence) is used.

It is to be noted that each of between the liquid crystal layer 6 and the pixel substrate 2, and between the liquid crystal layer 6 and the opposite substrate 3, an alignment film is disposed, and an incidence-side polarizing plate is disposed on the undersurface side of the pixel substrate 2, but the illustration is omitted here.

Figure 6A:
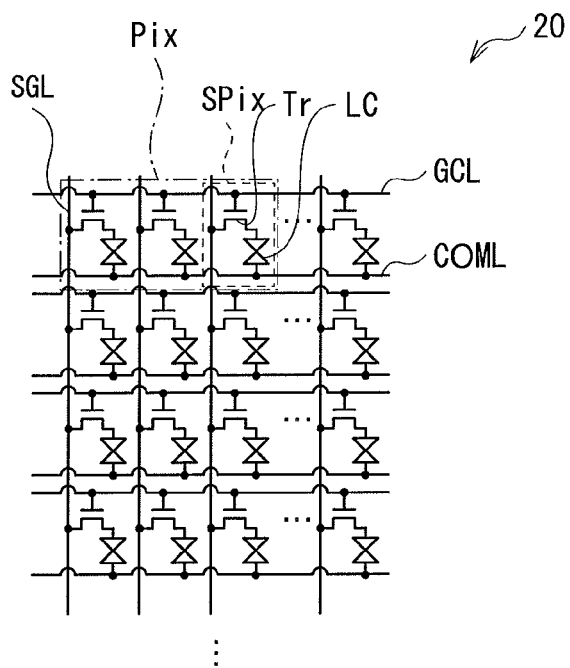
FIGS. 6A and 6B are a circuit diagram and a plan view, respectively, illustrating a pixel array of the display device with the touch detection function according to the embodiment.
Figure 6B:
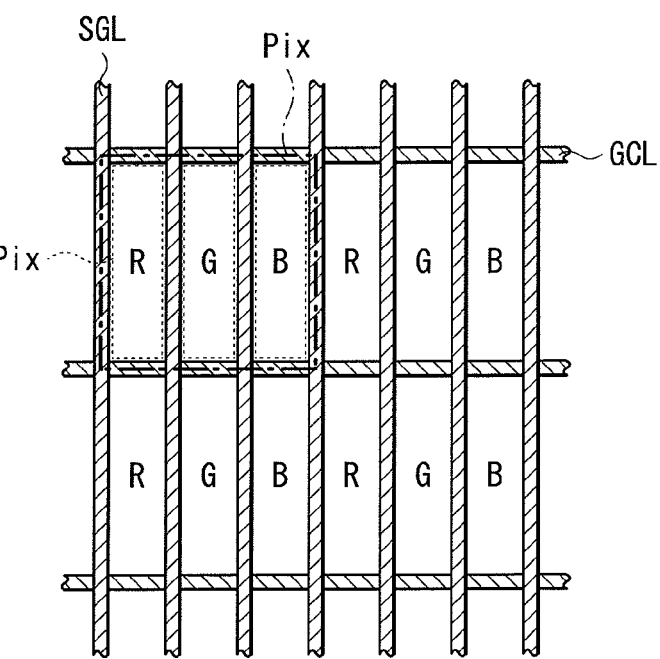

FIGS. 6A and 6B illustrate a configurational example of a pixel structure in the liquid-crystal display device 20. Specifically, FIG. 6A is a circuit diagram, and FIG. 6B is a plane view. The liquid-crystal display device 20 has a plurality of pixels Pix arranged in the form of a matrix. Each of the pixels Pix is configured to include three subpixels SPix. These three subpixels SPix are arranged to correspond to the three colors (RGB) of the color filter 32 illustrated in FIG. 5, respectively. The subpixel SPix has the TFT element Tr and a liquid crystal element LC. The TFT element Tr is configured by using a thin-film transistor and, in this example, configured by using an n-channel MOS (Metal Oxide Semiconductor) TFT. Of the TFT element Tr, a source is connected to the pixel signal line SGL, a gate is connected to the scanning signal line GCL, and a drain is connected to one end of the liquid crystal element LC. As for the liquid crystal element LC, one end is connected to a drain of the TFT element Tr, and the other end is connected to the drive electrode COML.

The subpixel SPix is connected to other subpixels SPix belonging to the same row of the liquid-crystal display device 20, by the scanning signal line GCL. The scanning signal line GCL is connected to the gate driver 12, and supplied with the scanning signal Vscan from the gate driver 12. In addition, the subpixel SPix is connected to other subpixels SPix belonging to the same row of the liquid-crystal display device 20, by the pixel signal line SGL. The pixel signal line SGL is connected to the source driver 13, and supplied with the pixel signal Vpix from the source driver 13.

Further, the subpixel SPix is connected to other subpixels SPix belonging to the same row of the liquid-crystal display device 20, by the drive electrode COML. The drive electrode COML is connected to the drive electrode driver 14, and supplied with the driving signal Vcom from the drive electrode driver 14.

The pixel signal line SGL and the scanning signal line GCL are disposed on the border between the subpixels SPix adjacent to each other, as illustrated in FIG. 6B. Specifically, the pixel signal line SGL is disposed on the border between the subpixels SPix adjacent to each other laterally, and the scanning signal line GCL is disposed on the border between the subpixels SPix adjacent to each other vertically. The pixel signal line SGL and the scanning signal line GCL are formed of, for example, a single layer or multilayer film made of aluminum, aluminum alloy, molybdenum, titanium, and the like. This prevents the light from passing through a part where the pixel signal line SGL and the scanning signal line GCL are provided.

Thanks to this configuration, in the liquid-crystal display device 20, the gate driver 12 drives the scanning signal line GCL so that the line sequential scanning is performed through time-sharing, and thereby one horizontal line is selected sequentially, and the pixels Pix belonging to the selected one horizontal line are supplied with the pixel signal Vpix from the source driver 13, and thereby display is performed for every one horizontal line.

Figure 7:
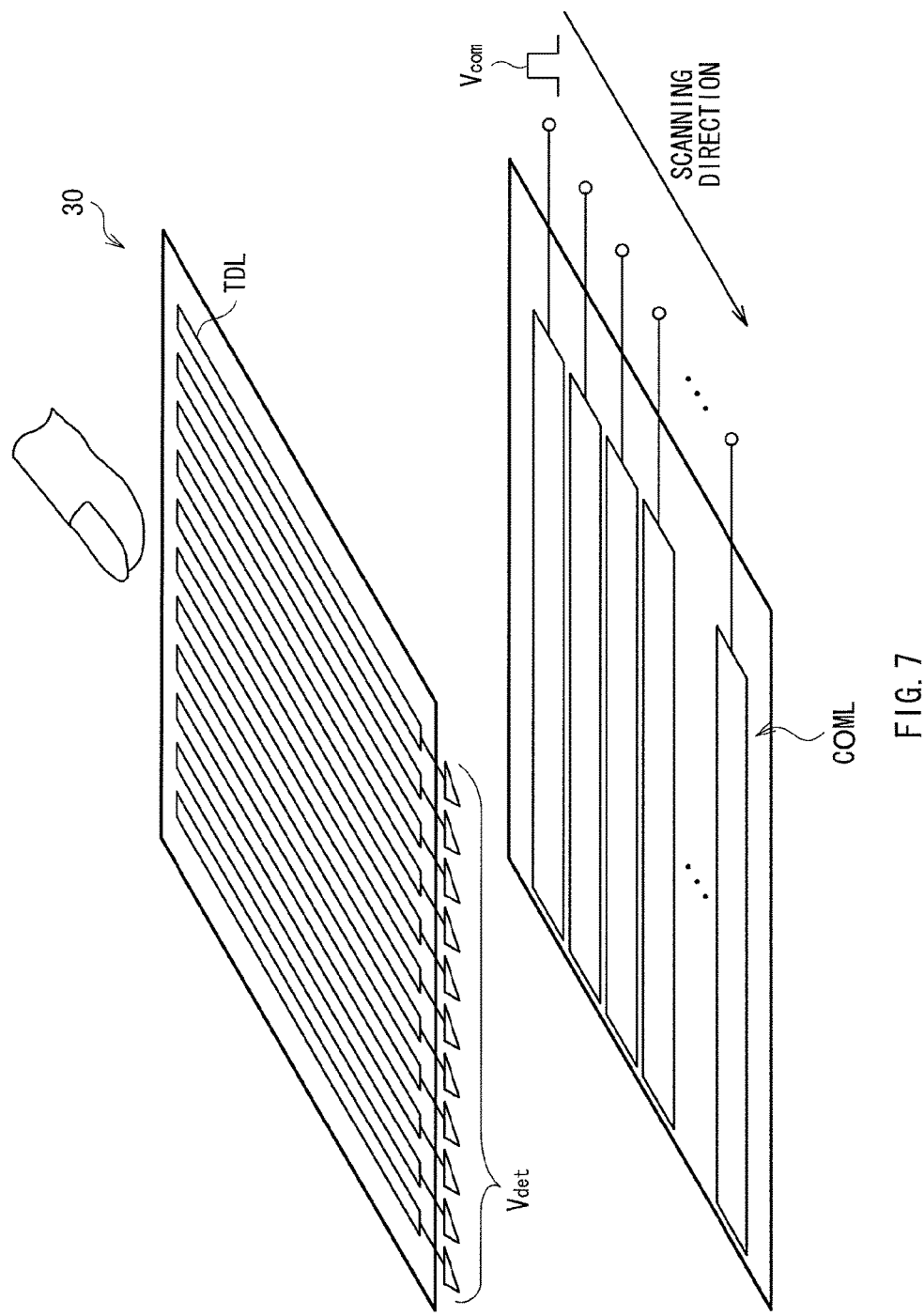
FIG. 7 is a perspective diagram illustrating a configurational example of a drive electrode and a touch detection electrode of the display device with the touch detection function according to the embodiment.

FIG. 7 illustrates a configurational example of the touch detection device 30 perspectively. The touch detection device 30 is configured to include the drive electrode COML and the touch detection electrode TDL provided in the opposite substrate 3. The drive electrode COML is partitioned into stripe-shaped electrode patterns extending in a lateral direction of this figure. When touch detection operation is performed, the driving signal Vcom is supplied sequentially from the drive electrode driver 14 to each of the electrode patterns, and sequential scanning driving is performed through time-sharing. The touch detection electrode TDL is configured to have an electrode pattern extending in a direction orthogonal to the direction in which the electrode patterns of the drive electrode COML extend. Each of the touch detection electrodes TDL has, as will be described later, the electrode pattern including strip-shaped electrode parts, in order to reduce an influence of the light transmittance in the touch detection electrode TDL on the luminance. A dummy electrode 37 (not illustrated) is disposed between the touch detection electrodes TDL (in a between-detection-electrode region), as will be described later. Each of the electrode patterns of the touch detection electrode TDL is connected to the touch detecting section 40. The electrode patterns crossing each other by the drive electrode COML and the touch detection electrodes TDL form a capacitance at the intersection.

By this configuration, in the touch detection device 30, the touch detection is performed in such a manner that the drive electrode driver 14 applies the driving signal Vcom to the drive electrode COML and thereby, the touch detection signal Vdet is outputted from the touch detection electrode TDL. In other words, the drive electrode COML corresponds to the drive electrode E1 in the basic principle of the touch detection illustrated in FIG. 1 to FIG. 3, the touch detection electrode TDL corresponds to the touch detection electrode E2 in this basic principle, and the touch detection device 30 is configured to detect a touch in accordance with this basic principle. As illustrated in FIG. 7, the electrode patterns intersecting each other form the capacitance touch sensor in the form of a matrix. Therefore, it is also possible to detect a position where a touch or an approach of an external proximity object has occurred, by performing the scanning across the touch detection surface of the touch detection device 30.

Figure 8:
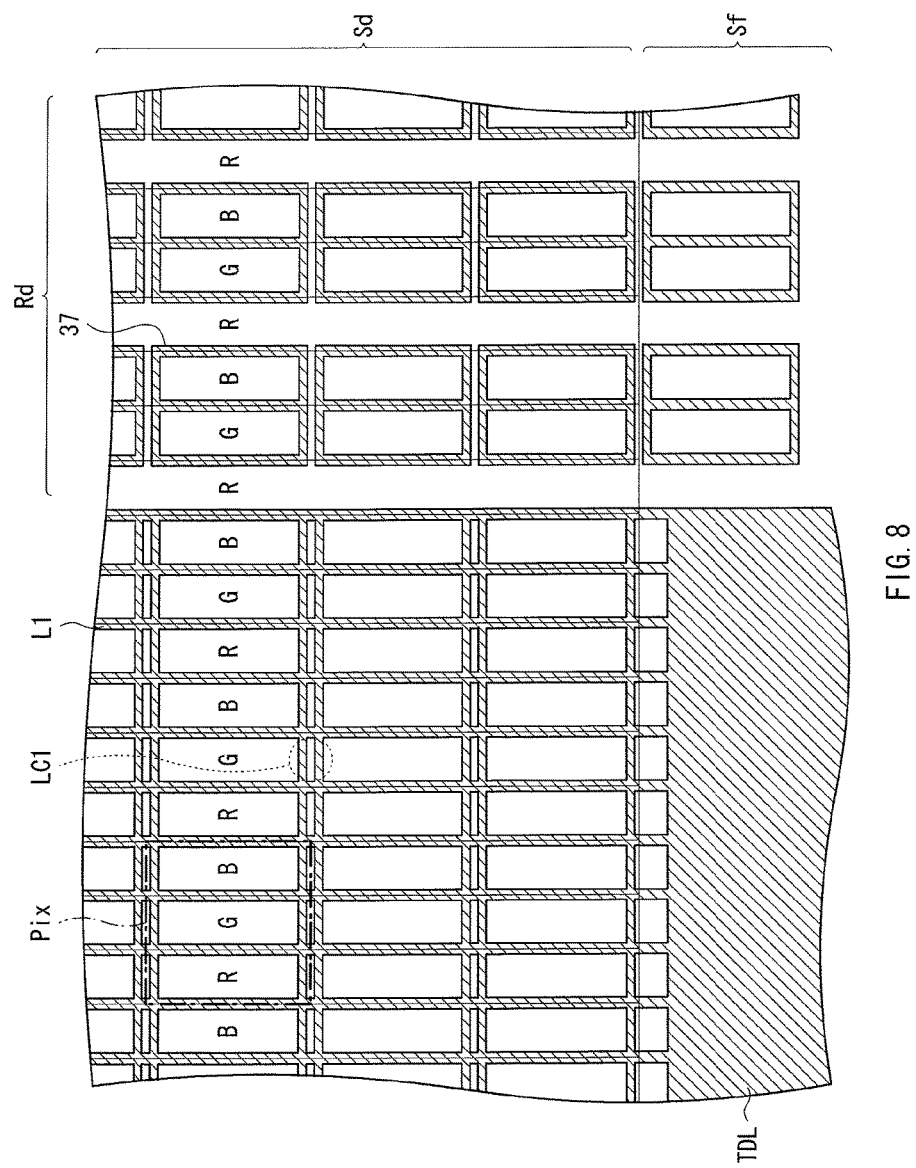
FIG. 8 is a plan view illustrating a configurational example of a touch detection electrode according to a first embodiment.

FIG. 8 illustrates a configurational example of the touch detection electrode TDL. The touch detection electrode TDL is formed to correspond to the pixel Pix. Specifically, the touch detection electrode TDL has a strip-shaped electrode part L1 formed on a part corresponding to the pixel signal line SGL illustrated in FIGS. 6A and 6B, in a display region Sd where the pixels Pix are disposed. The strip-shaped electrode parts L1 are connected to each other by a connection part LC1 formed at a position corresponding to the scanning signal line GCL. In this example, the connection part LC1 connects the adjacent strip-shaped electrode parts L1 at two locations in the position corresponding to the scanning signal line GCL, and overlaps the scanning signal line GCL although not illustrated. In other words, the strip-shaped electrode part L1 and the connection part LC1 are both disposed at the positions corresponding to a part allowing no light to pass therethrough (the pixel signal line SGL and the scanning signal line GCL). The strip-shaped electrode parts L1 of the touch detection electrode TDL are provided with pattern formation so as to be connected to each other in a frame region Sf outside the display region Sd, and are connected to the touch detecting section 40.

In a region between the touch detection electrodes TDL adjacent to each other (a between-detection-electrode region Rd), a plurality of dummy electrodes 37 are formed. The dummy electrode 37 is configured like the touch detection electrode TDL, by using ITO. The dummy electrode 37 is also formed to correspond to the pixel Pix. Specifically, the dummy electrode 37 is formed at a position corresponding to the pixel signal line SGL and the scanning signal line GCL, and in this example, as illustrated in FIG. 8, disposed to surround the subpixels SPix of green (G) and blue (B). Thus, the electrode pattern of the dummy electrode 37 in the between-detection-electrode region Rd is similar to the electrode pattern in the touch detection electrode TDL (the strip-shaped electrode part L1 and the connection part LC1). By configuring the dummy electrode 37 in this way, the light transmittance and the reflectance in these regions may have close values, and the touch detection electrode TDL may be difficult to see from the outside. In addition, each of the dummy electrodes 37 is not connected to other parts electrically, and is in a floating state.

Here, the subpixel SPix corresponds to a specific example of "the display element" according to the embodiment of the present disclosure. The pixel signal line SGL corresponds to a specific example of the "signal line" according to the embodiment of the present disclosure. The scanning signal line GCL corresponds to a specific example of the "selection line" according to the embodiment of the present disclosure. The pixel Pix corresponds to a specific example of the "display pixel" according to the embodiment of the present disclosure.

[Operation and Effect]

Subsequently, there will be described the operation and effect of the display unit 1 with the touch detection function in the present embodiment.

[Summary of Overall Operation]

The control section 11 supplies the control signal to each of the gate driver 12, the source driver 13, the drive electrode driver 14, and the touch detecting section 40, based on the image signal Vdisp supplied externally, and thereby performs control so that these elements operate in synchronization with one other. The gate driver 12 supplies the scanning signal Vscan to the liquid-crystal display device 20, thereby sequentially selecting one horizontal line targeted for the display driving. The source driver 13 supplies the pixel signal Vpix to each of the pixels Pix forming the one horizontal line selected by the gate driver 12. The drive electrode driver 14 applies the driving signal Vcom sequentially to the drive electrode COML. The display device 10 with the touch detection function performs the display operation, and also performs the touch detection operation based on the driving signal Vcom, thereby outputting the touch detection signal Vdet from the touch detection electrode TDL. The touch detecting section 40 determines the presence or absence and touch coordinates of a touch on the touch detection device 30, and outputs the result as the output signal Out.

[Touch Detection Electrode TDL]

In the display unit 1 with the touch detection function, the touch detection electrode TDL and the dummy electrode 37 are formed to correspond to the pixel Pix. This makes it possible to reduce a decline in the luminance and a shift in the chromaticity due to the light transmittance in the touch detection electrode TDL and the dummy electrode 37. The details will be described below.

The touch detection electrode TDL and the dummy electrode 37 are, as illustrated in FIG. 8, disposed on the parts corresponding to the pixel signal line SGL and the scanning signal line GCL illustrated in FIGS. 6A and 6B, in the display region Sd. In other words, these electrodes are disposed at the positions corresponding to the part originally allowing no light to pass therethrough. Thus, most of the light from the subpixel SPix does not pass through the touch detection electrode TDL and the dummy electrode 37. Generally, even when the touch detection electrode TDL and the dummy electrode 37 are formed by using a translucent material such as ITO, the light entering the electrode is weakened according to the transmittance to some extent, and emitted. In particular, in these electrodes, for example, when the film thickness is increased to lower the electrode resistance, or crystallization is insufficient in a manufacturing process, the light transmittance declines. In a case where such an electrode is formed on the subpixel SPix, the luminance of the subpixel SPix falls. In the display unit 1 with the touch detection function, the touch detection electrode TDL and the dummy electrode 37 are disposed at the positions corresponding to the part originally allowing no light to pass therethrough as illustrated in FIG. 8 and thereby, a decline in the luminance caused by these electrodes may be reduced.

Further, the touch detection electrode TDL and the dummy electrode 37 are formed to have the electrode patterns similar to each other around every subpixel SPix. In other words, the touch detection electrode TDL and the dummy electrode 37 are not formed around a certain subpixel SPix, in a noticeably large amount or in a noticeably small amount. In this way, these electrodes are not unevenly distributed locally and therefore, for example, a reduction in the luminance of the subpixel SPix of only a certain color due to the light transmittance in these electrodes will not occur and thus, it is possible to reduce a possibility that the chromaticity might deviate in the pixel Pix.

Furthermore, the electrode patterns of the touch detection electrode TDL and the dummy electrode 37 are formed to correspond to the subpixel SPix as illustrated in FIG. 8. Therefore, even if the touch detection electrode TDL and the dummy electrode 37 are formed at positions slightly shifted as a whole from the subpixel SPix, the influence of the shift will be the same for all the subpixels SPix. For example, when the touch detection electrode TDL and the dummy electrode 37 are formed at positions slightly shifted in a lateral direction from the subpixel SPix in FIG. 8, these electrodes are slightly shifted from all the subpixels SPix, and, for example, there is no such a case that the touch detection electrode TDL overlaps only the subpixel SPix of a certain color to a large extent. In other words, it is possible to reduce a shift in the chromaticity resulting from a manufacturing error.

In addition, in the display unit 1 with the touch detection function, the glass substrate 31 is made thin. When a user views the display surface of the display unit, a relative positional relationship between the pixel Pix and the touch detection electrode TDL changes depending on the viewing angle. In particular, when the glass substrate 31 is thick, the amount of a change in this relative positional relationship becomes large, and, for example, the strip-shaped electrode parts L1 of the touch detection electrode TDL illustrated in FIG. 8 overlap all the subpixels SPix to a great extent, raising a possibility that a reduction in the overall luminance or a shift in the chromaticity might occur. On the other hand, in the display unit 1 with the touch detection function, the glass substrate 31 is thin and therefore, it is possible to reduce a change in the relative positional relationship between the pixel Pix and the touch detection electrode TDL depending on the viewing angle, and thereby a change in image quality may be suppressed.

In addition, in the touch detection electrode TDL, the strip-shaped electrode parts L1 are connected to each other by the connection part LC1 as illustrated in FIG. 8. Providing the connection part LC1 in this way makes it possible to reduce the electrode resistance of the touch detection electrode TDL. In the display unit 1 with the touch detection function, the touch detection signal Vdet corresponding to the presence or absence of an external proximity object is transmitted through the touch detection electrode TDL, and inputted into the touch detecting section 40. Therefore, it is desirable that the electrode resistance of this touch detection electrode TDL be low. In other words, for example, when the electrode resistance of the touch detection electrode TDL is high, there is a possibility that the touch detection signal Vdet might attenuate when transmitted through the touch detection electrode TDL. In the touch detection electrode TDL, the connection part LC1 is provided and thus, it is possible to lower the electrode resistance of the touch detection electrode TDL and, for example, variations in the touch detection signals Vdet may be reduced.

[Effect]

As described above, in the present embodiment, the electrode patterns of the touch detection electrode and the dummy electrode are formed to correspond to the subpixel and thus, a similar electrode pattern may be formed every subpixel, and thereby a shift in the chromaticity may be reduced.

In addition, in the present embodiment, the electrode patterns of the touch detection electrode and the dummy electrode are formed at the positions corresponding to the pixel signal line and the scanning signal line and thus, it is possible to weaken an influence of the light transmittance in the touch detection electrode and reduce a decline in the luminance.

Moreover, in the present embodiment, the glass substrate 31 is made thin and thus, it is possible to suppress a change in image quality depending on the angle at which the user views.

Further, in the present embodiment, the connection part is provided in the touch detection electrode and thus, it is possible to lower the electrode resistance of the touch detection electrode.

[Modification 1-1]

Figure 9:
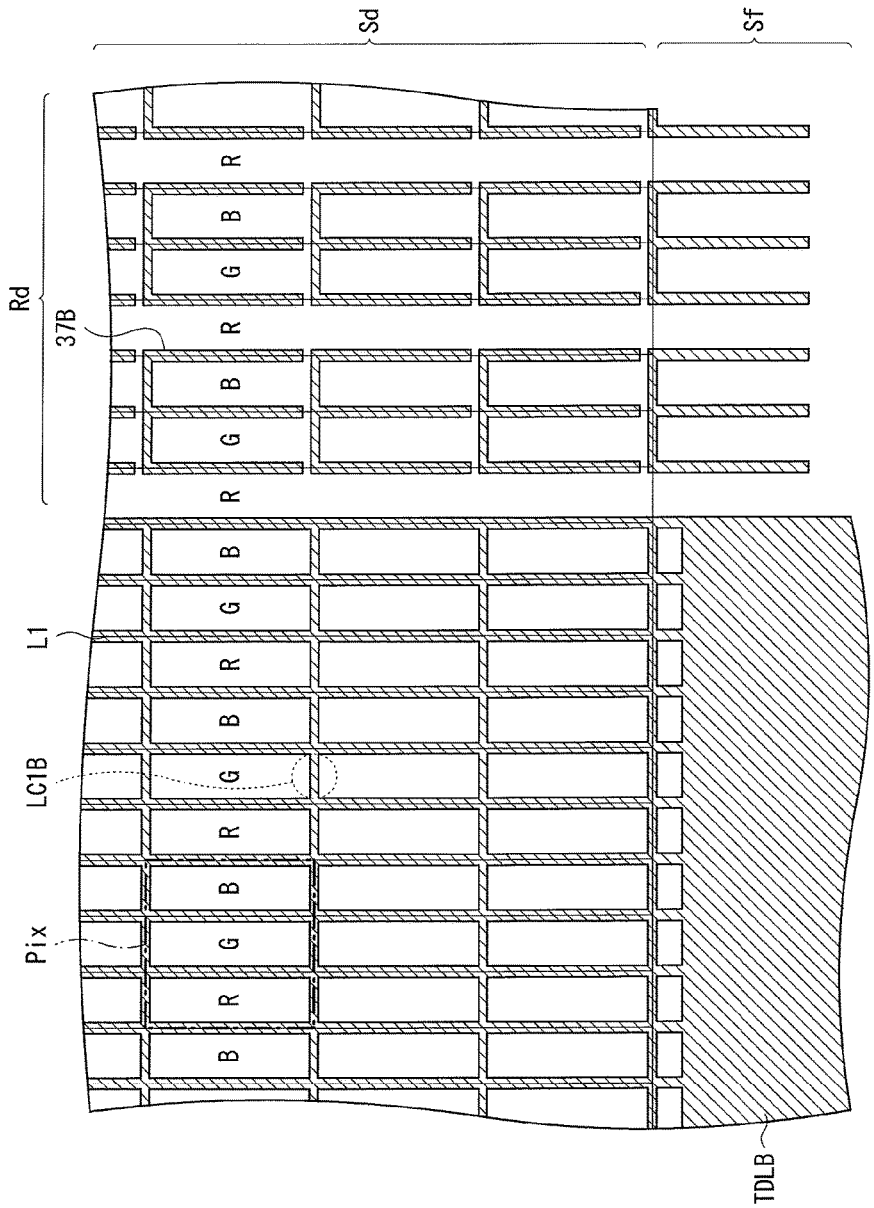
FIG. 9 is a plan view illustrating a configurational example of a touch detection electrode according to a modification of the first embodiment.

In the embodiment described above, the connection part LC1 connects the adjacent strip-shaped electrode parts L1 at the two locations, but is not limited to this and instead, may establish connection at one location as illustrated in FIG. 9. In a display unit with a touch detection function according to this modification, this connection part (a connection part LC1B) may be disposed to overlap a scanning signal line GCL and thus, it is possible to reduce a decline in the luminance caused by a touch detection electrode, as compared to the above-described embodiment.

[Modification 1-2]

Figure 10:
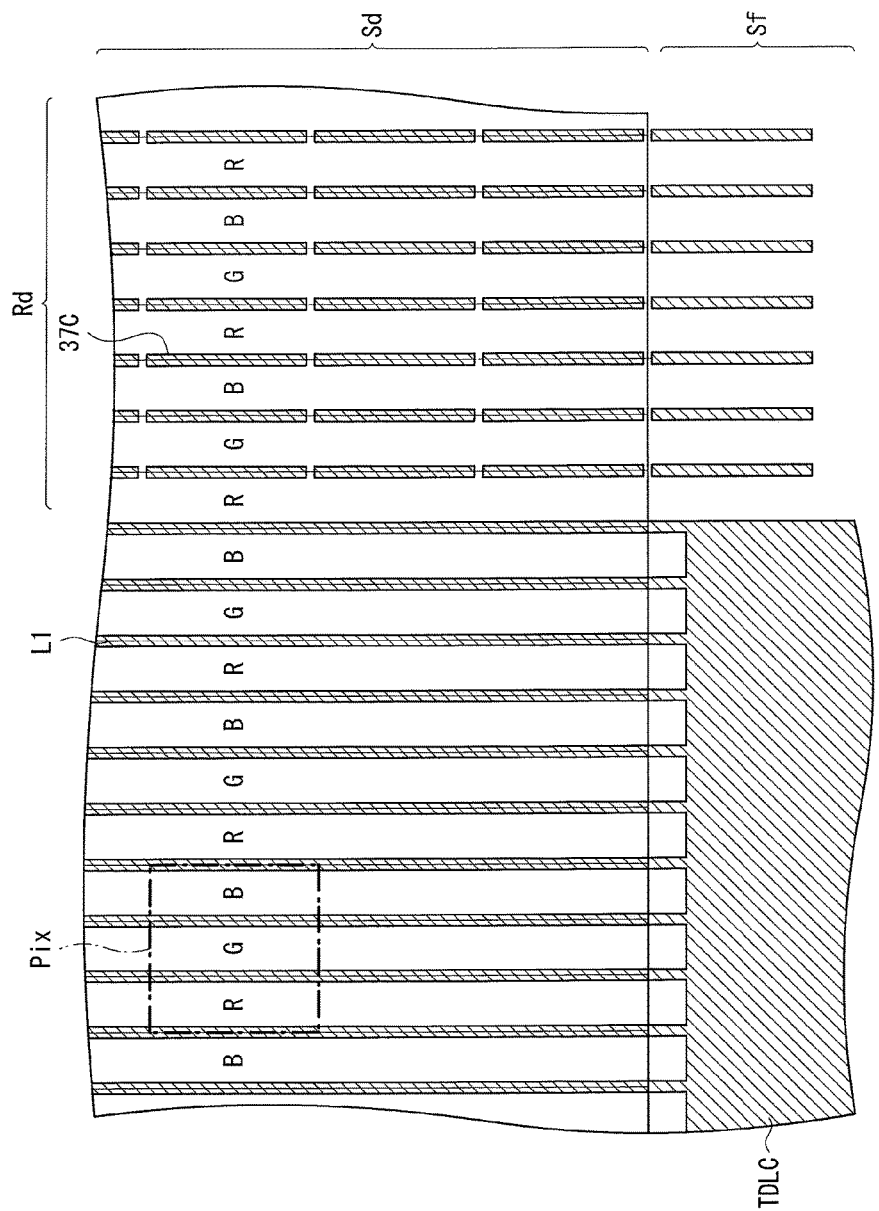
FIG. 10 a plan view illustrating a configurational example of a touch detection electrode according to another modification of the first embodiment.
Figure 11:
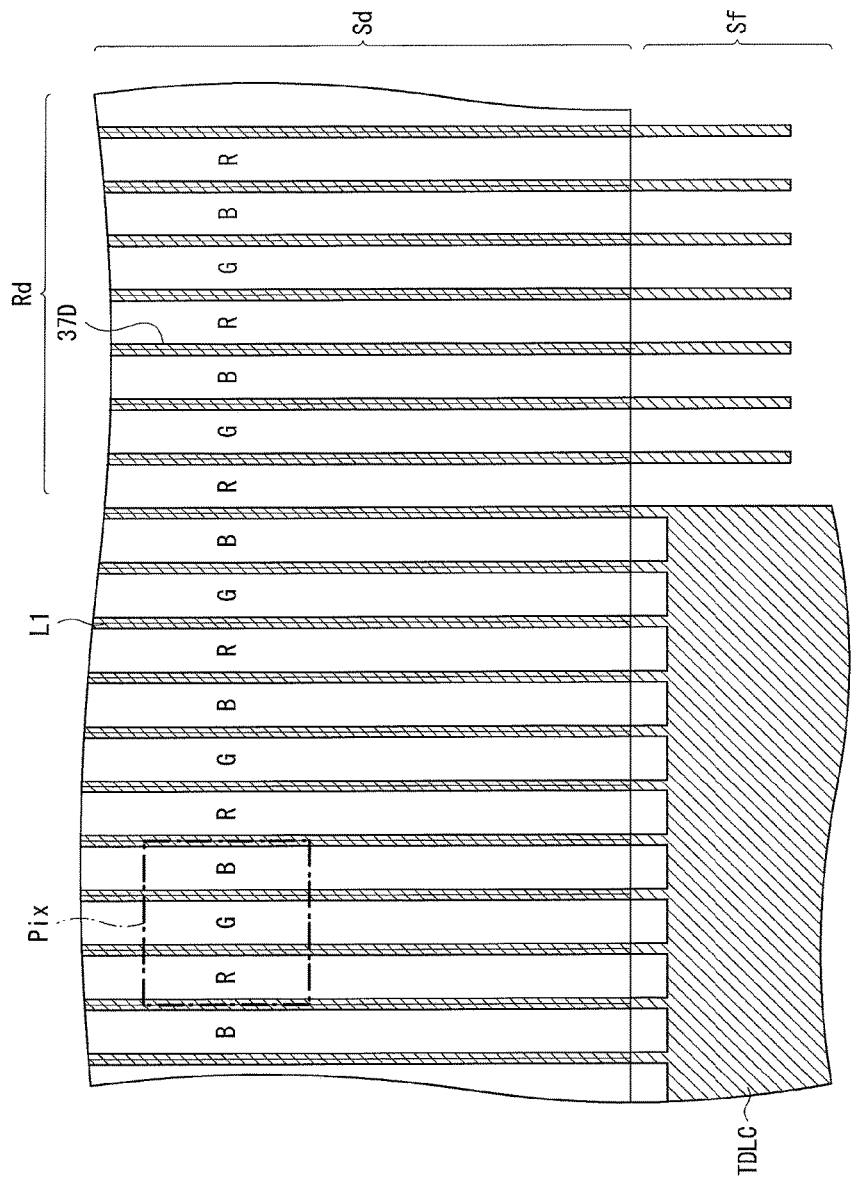
FIG. 11 is a plan view illustrating a configurational example of a touch detection electrode and a dummy electrode according to another modification of the first embodiment.

In the embodiment described above, the connection part LC1 is provided, but this poses no limitation, and instead, this connection part may be omitted as illustrated in FIG. 10, for example. In this case, electrode parts in a lateral direction of the figure are omitted in a between-detection-electrode region Rd as well, in order to make the electrode patterns of a touch detection electrode TDLC and the between-detection-electrode region Rd similar to each other. In addition, the dummy electrode may be configured as, for example, an electrode (a dummy electrode 37D) long in a vertical direction as illustrated in FIG. 11, by connecting dummy electrodes 37C illustrated in FIG. 10 which are adjacent to each other in a vertical direction of FIG. 10. This makes it possible to provide more similar electrode patterns of the touch detection electrode TDLC and the between-detection-electrode region Rd, and the touch detection electrode TDLC may be difficult to see from the outside.

(3. Second Embodiment)

Next, there will be described a display unit 5 with a touch detection function according to the second embodiment of the present disclosure. In the present embodiment, at a position corresponding to a subpixel SPix of a color in which the light transmittance in a touch detection electrode and a dummy electrode is the highest among three colors of red (R), green (G), and blue (B), these electrodes are provided. In other words, the display unit 5 with the touch detection function is configured by using a display device 50 with such a touch detection function. Other structures are similar to those in the first embodiment described above (FIG. 4 etc.). It is to be noted that the elements substantially same as those of the display unit 1 with the touch detection function in the first embodiment will be provided with the same reference characters as those in the first embodiment, and the description will be omitted as appropriate.

Figure 12:
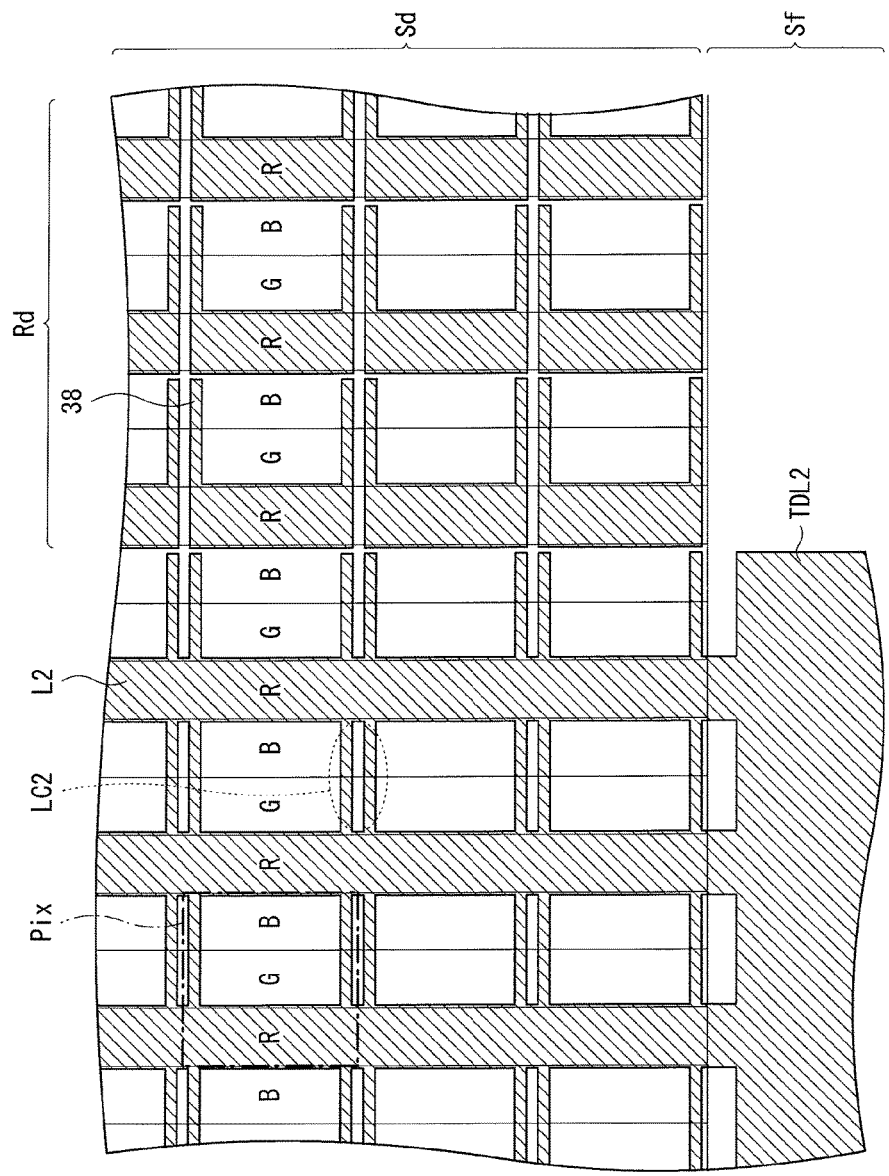
FIG. 12 is a plan view illustrating a configurational example of a touch detection electrode according to a second embodiment.

FIG. 12 illustrates a configurational example of a touch detection electrode TDL2 according to the display unit 5 with the touch detection function. The touch detection electrode TDL2 is formed at a position corresponding to a subpixel SPix of red (R), to have a width corresponding to the width of this subpixel SPix. Electrode parts of the touch detection electrode TDL2 formed at the position corresponding to the subpixel SPix of red (R) are connected to each other by a connection part LC2 formed at a position corresponding to a scanning signal line GCL, like the touch detection electrode TDL (FIG. 8) according to the first embodiment described above.

In a between-detection-electrode region Rd, a plurality of dummy electrodes 38 are formed, like the touch detection electrode TDL (FIG. 8) according to the first embodiment described above. The dummy electrodes 38 are formed at positions corresponding to the subpixels SPix of red (R), and the touch detection electrode TDL2 and the between-detection-electrode region Rd have similar electrode patterns.

Figure 13:
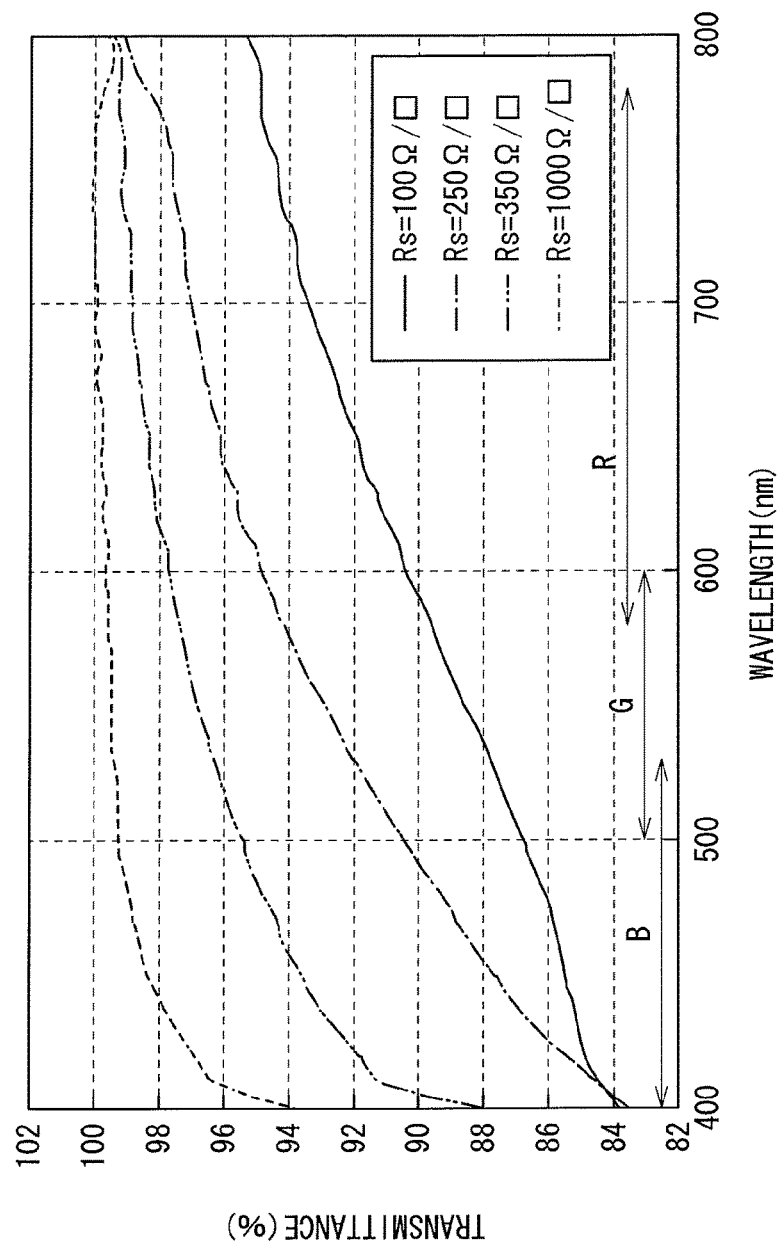
FIG. 13 is a characteristic diagram illustrating light transmittance in a touch detection electrode.

FIG. 13 illustrates light transmittance in each of ITO electrodes varying in film thickness. A horizontal axis indicates the wavelength of light, and a vertical axis indicates the light transmittance. In this example, the film thickness is expressed using a sheet resistance Rs. In other words, a film thickness having the smallest sheet resistance Rs (sheet resistance Rs=100 [Ω/□]) represents the largest film thickness and a film thickness having the largest sheet resistance Rs (sheet resistance Rs=1000 [Ω/□]) represents the smallest film thickness. As illustrated in FIG. 13, the larger the film thickness is (the smaller the sheet resistance Rs is), the more apparent the wavelength dependence of the transmittance is. In particular, in the wavelength range of red (R) among three colors of red (R, 580 to 780 [nm]), green (G, 500 to 600 [nm]), and blue (B, 400 to 530 [nm]), the transmittance in the ITO electrode is the highest.

In the display unit 5 with the touch detection function, the touch detection electrode TDL2 and the dummy electrode 38 are formed only at the position corresponding to the subpixel SPix of red (R) that is the color whose transmittance is the highest in the ITO electrode. In other words, only the light of red (R) with the highest transmittance weakens in the touch detection electrode TDL2 and the dummy electrode 38, and green (G) and blue (B) are outputted without going through these electrodes and therefore, it is possible to reduce a decline in the luminance due to the touch detection electrode TDL2 and the dummy electrode 38.

Further, in the display unit 5 with the touch detection function, each strip-shaped electrode part L2 of the touch detection electrode TDL2 is formed to have a width corresponding to the width of the subpixel SPix and thus, it is possible to reduce electrode resistance, as compared to the display unit 1 with the touch detection function according to the first embodiment described above.

[Characteristic Comparison Between ITO Electrode Patterns]

In the display unit 5 with the touch detection function, the ITO electrode is disposed only at the position corresponding to the subpixel SPix of red (R), but various other types of ITO electrode pattern are conceivable. Thus, using more than one ITO electrode pattern, a simulation of a characteristic to serve as a display unit was conducted. The details will be described below.

Figure 14A:
FIGS. 14A to 14E are schematic diagrams each illustrating an electrode pattern of a touch detection electrode.
Figure 14B:
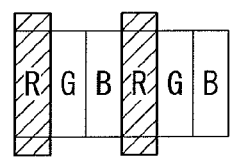
Figure 14C:
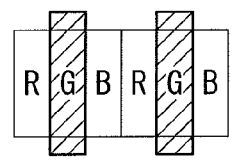
Figure 14D:
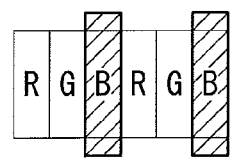
Figure 14E:
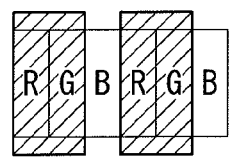

FIGS. 14A to 14E schematically illustrate electrode patterns of ITO electrodes for each of which simulation has been performed. FIG. 14A illustrates a case (a pattern PRGB) where an ITO electrode is formed to cover all subpixels SPix of three colors of red (R), green (G), and blue (B). FIGS. 14B to 14D illustrate cases (a pattern PR, a pattern PG, and a pattern PB) where ITO electrodes are formed only at positions corresponding to subpixels SPix of red (R), subpixels SPix of green (G), and subpixels SPix blue (B), respectively. FIG. 14E illustrates a case (a pattern PRG) where ITO electrodes are formed only at positions corresponding to subpixels SPix of red (R) and green (G).

Figure 15:
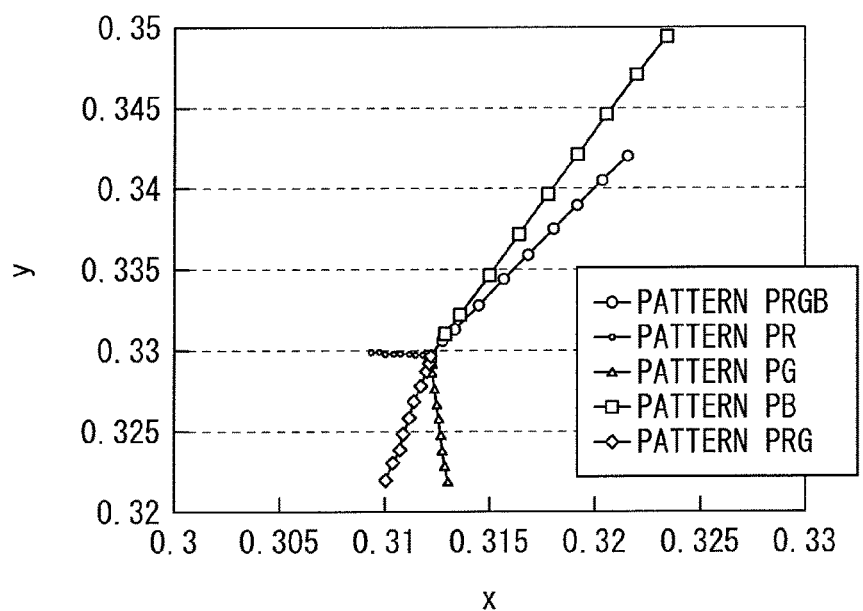
FIG. 15 is a plot representing a simulation result of W chromaticity.

FIG. 15 illustrates a simulation result of W chromaticity when the film thickness of the ITO electrode is changed, in each of the five types of electrode patterns illustrated in FIGS. 14A to 14E. As illustrated in FIG. 15, the W chromaticity changes such that the larger the film thickness t of the ITO electrode is, the farther the W chromaticity goes away from near white (P0). For example, the W chromaticity of each of the pattern PRGB and the pattern PB shifts greatly in a direction in which both x and y increase (i.e., toward yellow) as the film thickness t becomes greater. On the other hand, the W chromaticity of the pattern PR shifts slightly in a direction in which x decreases (i.e., toward light blue) as the film thickness t becomes greater. In other words, there is indicated that it is possible to suppress a shift in the chromaticity to the greatest extent, in the case where the ITO electrode is formed only at the position corresponding to the subpixel SPix of red (R) illustrated in FIG. 14B (namely, the pattern PR).

Figure 16:
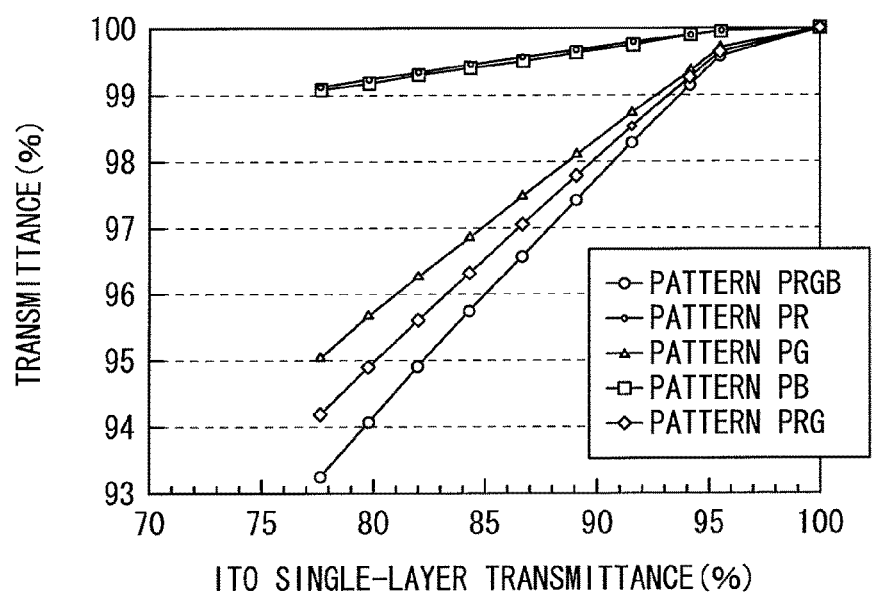
FIG. 16 is a plot representing a simulation result of a transmittance ratio.

FIG. 16 illustrates a simulation result of a transmittance ratio when the film thickness of the ITO electrode is changed, in each of the five types of electrode patterns illustrated in FIGS. 14A to 14E. A horizontal axis represents ITO single-layer transmittance, and indicates that the greater the ITO single-layer transmittance is, the smaller a film thickness t of the electrode is, and the smaller the ITO single-layer transmittance is, the larger the film thickness t of the electrode is. A vertical axis represents the transmittance ratio, and shows a value when a case where no ITO electrode is provided is assumed to be 100%. As illustrated in FIG. 16, the larger the film thickness t is (the smaller the ITO single-layer transmittance is), the lower the transmittance ratio becomes. At the time, in each of the pattern PR and the pattern PB, a change in the transmittance ratio is small. In particular, the change in the transmittance ratio in the pattern PR is small, because the color of red (R) has the light transmittance higher than those of other colors as illustrated in FIG. 13 and further, the visibility of human eyes for this color is poor.

With reference to FIG. 15 and FIG. 16, optical characteristic to serve as the display unit has been described above. However, the electrode resistance of the ITO electrode is also an important parameter, from the viewpoint of the touch detection device. Therefore, for two patterns with different electrode widths, the relationship between the electrode resistance and the transmittance is simulated.

Figure 17:
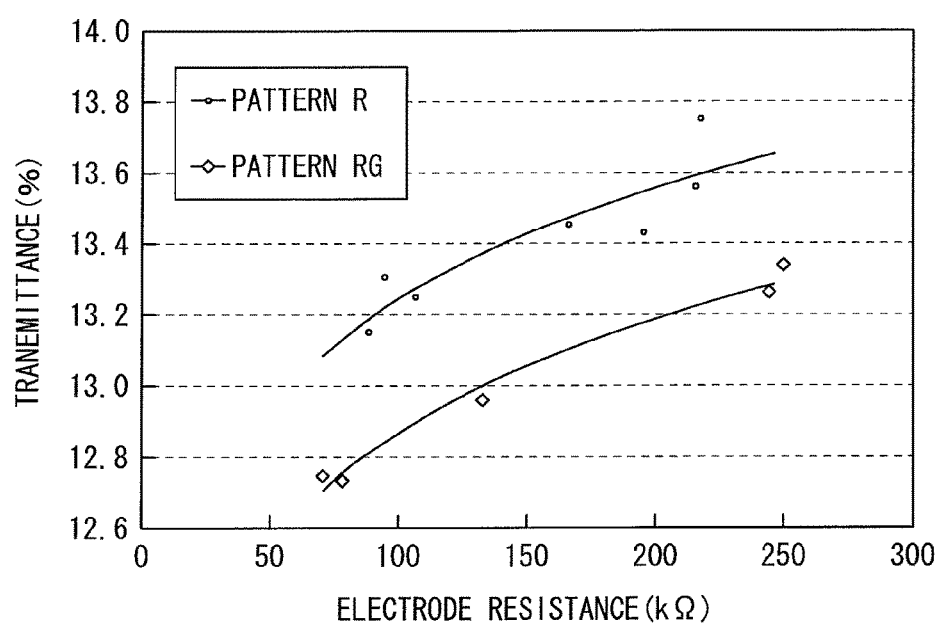
FIG. 17 is a characteristic diagram illustrating an electrode-resistance dependence of transmittance.

FIG. 17 illustrates the electrode resistance dependence of the transmittance in each of the pattern PR and the pattern PRG A horizontal axis indicates the electrode resistance, and a vertical axis indicates the light transmittance. As illustrated in FIG. 17, the transmittance in the pattern PR illustrated in FIG. 14B may realize the transmittance higher than that of the pattern PRG illustrated in FIG. 14E, even when their electrode resistances are the same. In other words, in the pattern PR, it is possible to realize the higher transmittance, with the electrode resistance equal to that of the pattern PRG by making the film thickness t larger than that of the pattern PRG.

As described above, in the present embodiment, the electrode patterns of the touch detection electrode and the dummy electrode are formed at the position corresponding to the subpixel of red and thus, it is possible to reduce a decline in the luminance and a shift in the chromaticity.

In addition, in the present embodiment, the electrode patterns of the touch detection electrode and the dummy electrode are each formed to have the width corresponding to the width of the subpixel and thus, it is possible to reduce the electrode resistance as compared to the display unit 1 with the touch detection function in the first embodiment.

Moreover, in the present embodiment, the electrode pattern of the touch detection electrode is formed at the position corresponding to the subpixel of red to have the width corresponding to the width of this subpixel and thus, it is possible to realize the high transmittance while reducing the electrode resistance.

Other effects are similar to those in the first embodiment.
[Modification 2-1]

In the embodiment described above, the connection part LC2 connects the strip-shaped electrode parts L2 to each other at the two locations, but is not limited this case, and instead may establish the connection at one location, like the modification of the first embodiment.
[Modification 2-2]

Figure 18:
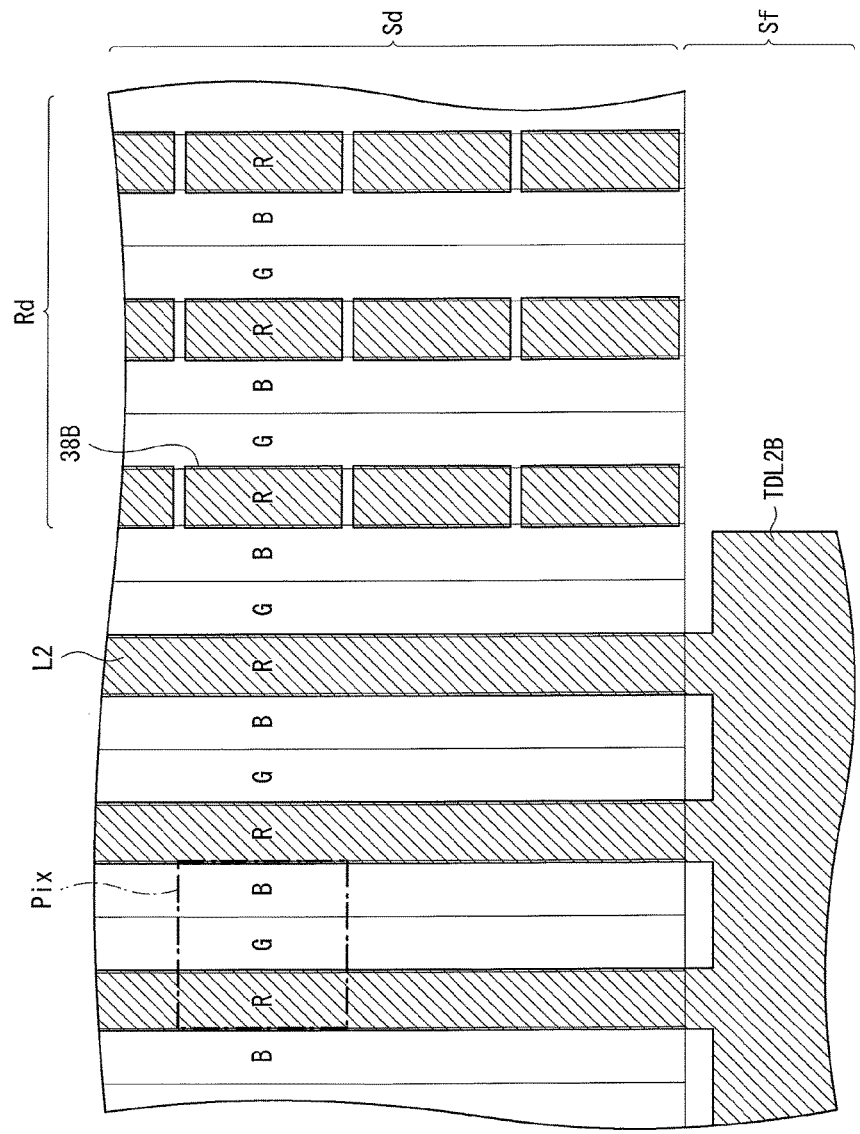
FIG. 18 is a plan view illustrating a configurational example of a touch detection electrode according to a modification of the second embodiment.

In the embodiment described above, the connection part LC2 is provided, but this poses no limitation, and instead, the connection part may be omitted as illustrated FIG. 18, for example. In this case, in order to allow a touch detection electrode TDL2B and a between-detection-electrode region Rd to have similar electrode patterns, electrode parts in a lateral direction of the dummy electrode 38 illustrated in FIG. 12 are omitted as well to configure a dummy electrode 38B, in the between-detection-electrode region Rd. In addition, this dummy electrode may be configured, for example, as an electrode long in a vertical direction, like the modification of the first embodiment, by connecting the dummy electrodes 38B illustrated in FIG. 18 which are adjacent to each other in a vertical direction of the figure.
(4. Third Embodiment)

Now, there will be described a display unit 7 with a touch detection function according to the third embodiment of the present disclosure. In the present embodiment, a touch detection electrode and a dummy electrode are each formed to have a width corresponding to more than one subpixel SPix, and an opening is formed at a position corresponding to a subpixel SPix of a color with the lowest light transmittance in these electrodes, among three colors of red (R), green (G), and blue (B). In other words, the display unit 7 with the touch detection function is configured using a display device 70 with such a touch detection function. Other structures are similar to those of the first embodiment (FIG. 4 etc.). It is to be noted that the elements substantially same as those of the display unit 1 with the touch detection function in the first embodiment will be provided with the same reference characters as those in the first embodiment, and the description will be omitted as appropriate.

Figure 19:
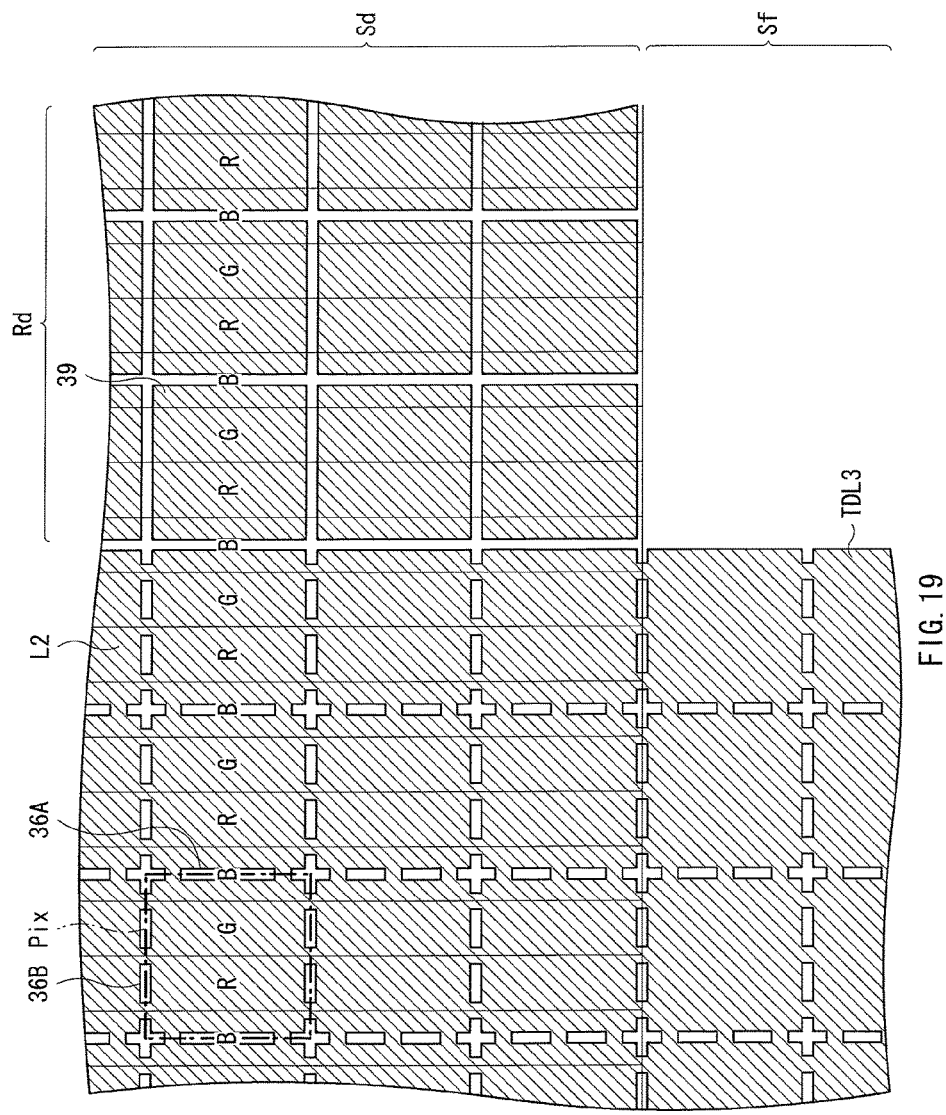
FIG. 19 is a plan view illustrating a configurational example of a touch detection electrode according to a third embodiment.

FIG. 19 illustrates a configurational example of a touch detection electrode TDL3 according to the display unit 7 with the touch detection function. The touch detection electrode TDL3 is formed to have a width corresponding to more than one subpixel SPix, and in a display region Sd, a plurality of openings 36 (openings 36A and 36B) are formed. These openings 36 are formed to correspond to a pixel Pix. Specifically, the opening 36A is formed at a position corresponding to a subpixel SPix of blue (B), and the opening 36B is located at a position corresponding to the border of the pixels Pix in a vertical direction of this figure. In this way, these openings 36 are formed for every pixel Pix.

A plurality of dummy electrodes 39 are formed in a between-detection-electrode region Rd. The dummy electrode 39 also is formed to correspond to the pixel Pix. Specifically, in FIG. 19, the dummy electrodes 39 are arranged so that a gap between the dummy electrodes 39 adjacent in a lateral direction of this figure corresponds to the subpixel SPix of blue (B) in the pixel Pix. Further, the dummy electrodes 39 are arranged so that a gap between the dummy electrodes 39 adjacent in a vertical direction of this figure corresponds to the border between the pixels Pix. Thus, the electrode pattern of the touch detection electrode TDL3 and the electrode pattern of the between-detection-electrode region Rd are similar to each other.

In the display unit 7 with the touch detection function, the opening 36A in the touch detection electrode TDL3 and the gap between the dummy electrodes 39 adjacent in the lateral direction of FIG. 19 are located at the position corresponding to the subpixel SPix of blue (B). This corresponds to, as illustrated in FIG. 13, a case where the light transmittance in the touch detection electrode TDL3 and the dummy electrode 39 (ITO electrode) is the lowest in blue (B), among red (R), green (G), and blue (B). In other words, by providing the subpixel SPix of blue (B) at the position of the opening 36A and the gap between the dummy electrodes 39, it is possible to suppress weakening of the light of blue in these electrodes.

The electrode pattern illustrated in FIG. 19 corresponds to a case where the openings 36 are provided in the pattern PRGB illustrated in FIG. 14A. As illustrated in FIG. 15, the W chromaticity of this pattern PRGB shifts toward yellow as the film thickness t of the ITO electrode increases. This means that the light of blue (B) is weaker than other two colors. Therefore, by providing the opening 36A on a part corresponding to the subpixel SPix of blue (B) as illustrated in FIG. 19, it is possible to suppress weakening of the light of blue (B) by the ITO electrode and the shift in the chromaticity as indicated by the pattern PRGB illustrated in FIG. 15.

In addition, in the display unit 7 with the touch detection function, the opening 36A and the gap between the dummy electrodes 39 adjacent in the lateral direction are formed to be located near a center of the width of the subpixel SPix of blue (B). As a result, even when the touch detection electrode TDL3 and the dummy electrode 39 are formed at positions slightly deviated from the subpixel SPix as a whole due to a manufacturing error, it is possible to reduce the above-described shift in the chromaticity, as long as the opening 36A is formed on the subpixel SPix of blue (B). In other words, it is possible to reduce a shift in the chromaticity resulting from a manufacturing error.

As described above, in the present embodiment, the opening 36A of the touch detection electrode TDL3 is formed at the position corresponding to the subpixel of blue, it is possible to reduce a shift in the chromaticity. Other effects are similar to those of the first and second embodiments described earlier.

(5. Application Examples)

Next, with reference to FIG. 20 to FIG. 24G there will be described application examples of the display unit with the touch detection function in each of the embodiments and the modifications described above. The display unit with the touch detection function in each of the embodiments and the like described above may be applied to electronic devices in all fields, such as television devices, digital cameras, laptop computers, portable terminal devices such as portable telephones, and video cameras. In other words, it is possible to apply the display unit with the touch detection function in each of the embodiments and the like described above to electronic devices in all fields, which display externally-input video signals or internally-generated video signals as still or moving images.

Application Example 1

Figure 20:
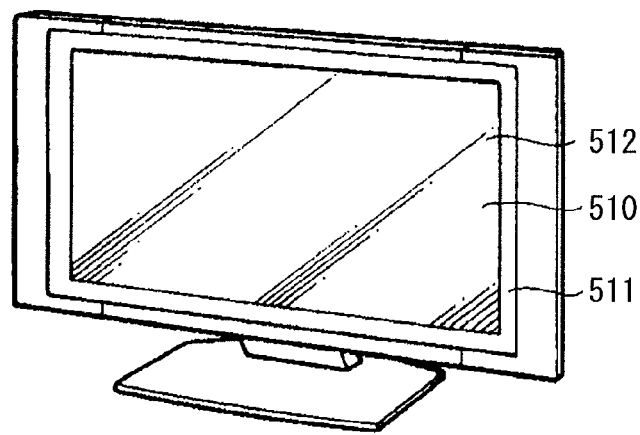
FIG. 20 is a perspective view illustrating a configuration of an appearance of an application example 1, among display devices to which any of the embodiments is applied.

FIG. 20 illustrates an external view of a television device to which the display unit with the touch detection function in any of the embodiments and the like described above is applied. This television device has, for example, a video display screen section 510 that includes a front panel 511 and a filter glass 512, and this video display screen section 510 is configured using the display unit with the touch detection function according to any of the embodiments and the like described above.

Application Example 2

Figure 21A:
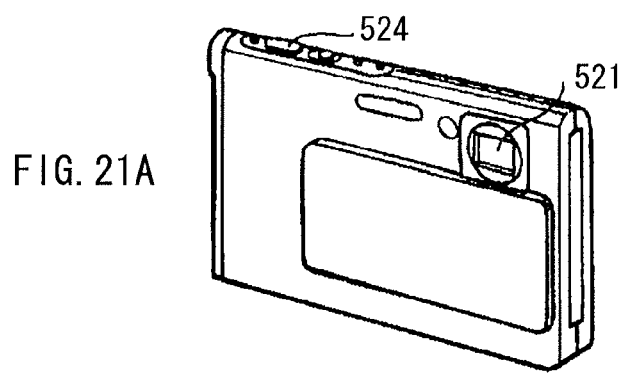
FIGS. 21A and 21B are perspective views each illustrating a configuration of an appearance of an application example 2.
Figure 21B:
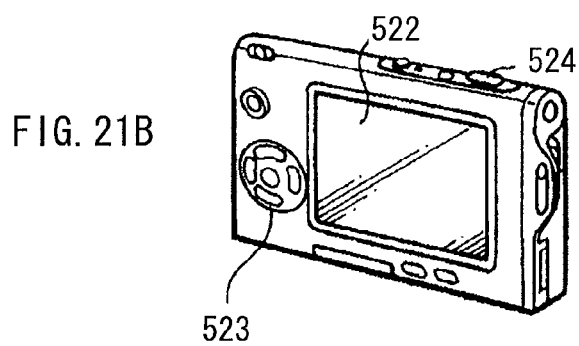

FIGS. 21A and 21B each illustrate an external view of a digital camera to which the display unit with the touch detection function in any of the embodiments and the like described above is applied. This digital camera includes, for example, a flash emitting section 521, a display section 522, a menu switch 523, and a shutter release 524, and the display section 522 is configured using the display unit with the touch detection function according to any of the embodiments and the like described above.

Application Example 3

Figure 22:
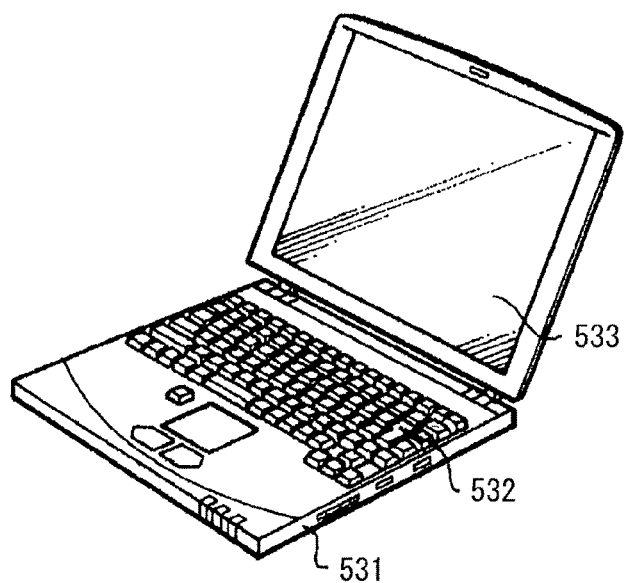
FIG. 22 is a perspective view illustrating a configuration of an appearance of an application example 3.

FIG. 22 illustrates an external view of a laptop computer to which the display unit with the touch detection function in any of the embodiments and the like described above is applied. This laptop computer includes, for example, a main section 531, a keyboard 532 for entering characters and the like, and a display section 533 that displays an image, and the display section 533 is configured using the display unit with the touch detection function according to any of the embodiments and the like described above.

Application Example 4

Figure 23:
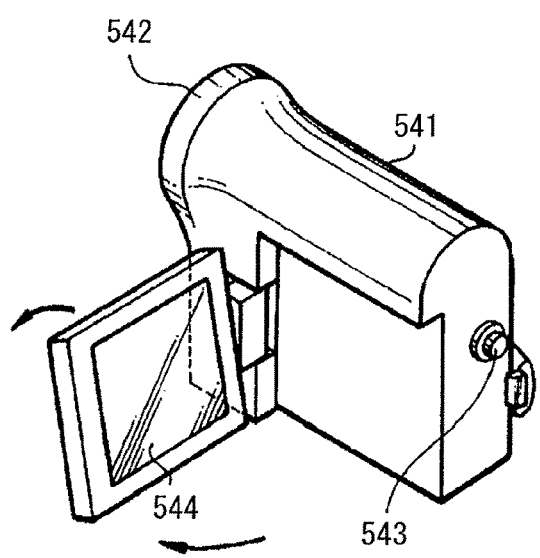
FIG. 23 is a perspective view illustrating a configuration of an appearance of an application example 4.
Figure 24:
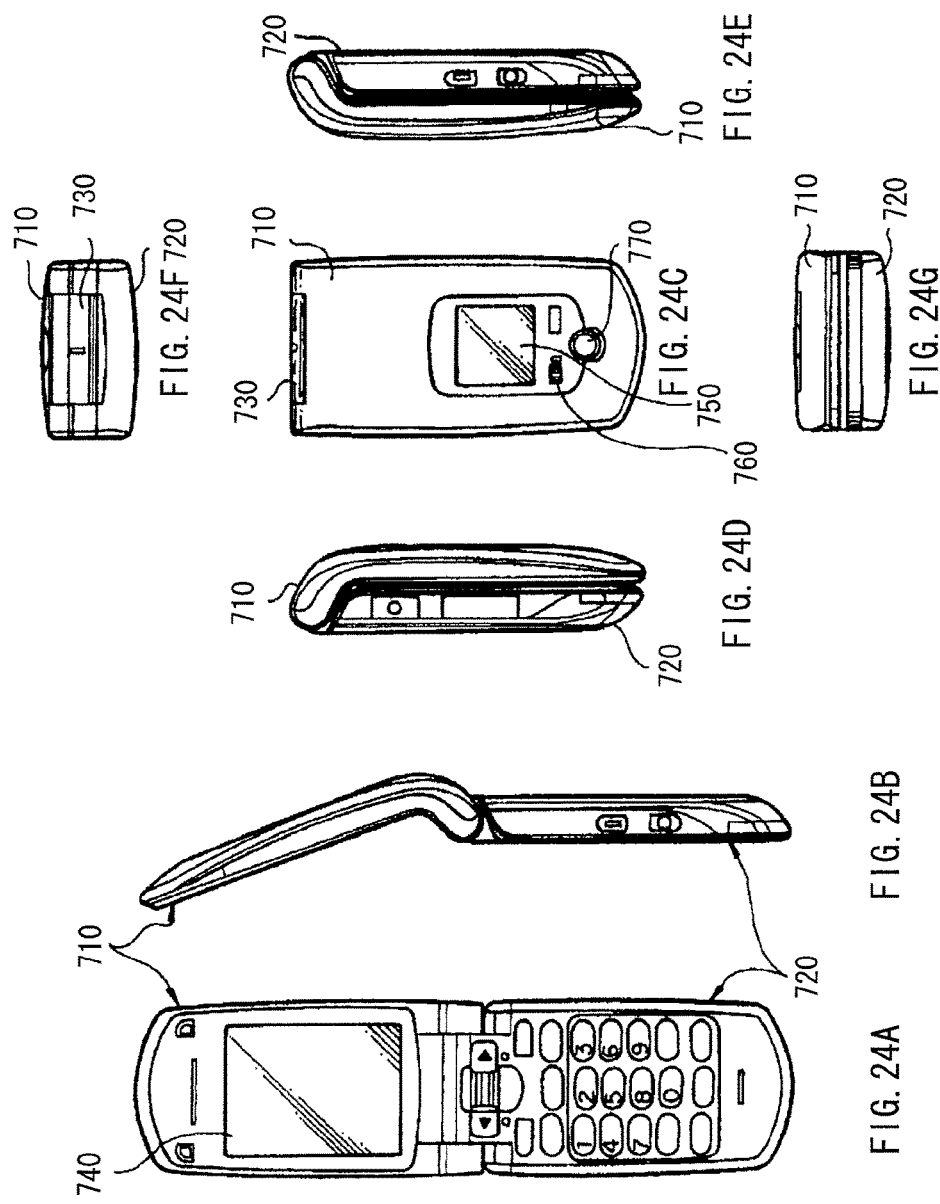
FIGS. 24A to 24G illustrate front views, side views, a top view, and a bottom view each representing a configuration of an appearance of an application example 5.

FIG. 23 illustrates an external view of a video camera to which the display unit with the touch detection function in any of the embodiments and the like described above is applied. This video camera includes, for example, a main section 541, a lens 542 disposed on a front face of this main section 541 to shoot an image of a subject, a start/stop switch 543 used at the time of shooting, and a display section 544, and the display section 544 is configured using the display unit with the touch detection function according to any of the embodiments and the like described above.

Application Example 5

FIGS. 24A to 24G illustrate external views of a portable telephone to which the display unit with the touch detection function in any of the embodiments and the like described above is applied. This portable telephone is, for example, a device in which an upper housing 710 and a lower housing 720 are connected by a coupling section (hinge section) 730, and includes a display 740, a sub-display 750, a picture light 760, and a camera 770. The display 740 or the sub-display 750 is configured using the display unit with the touch detection function according to any of the embodiments and the like described above.

The present technology has been described by using some embodiments, modifications, and application examples to electronic devices, but is not limited to these embodiments and like, and may be variously modified.

For example, in each of the embodiments and the like described above, the translucent layer 33 is formed between the glass substrate 31 and the touch detection electrode TDL, but is not limited to this example, and may be formed on the touch detection electrode TDL instead.

For example, in each of the embodiments and the like described above, the translucent layer 33 is provided, but this poses no limitation, and the translucent layer 33 may be omitted instead.

For example, in each of the embodiments and the like described above, the dummy electrode is provided in the between-detection-electrode region Rd, but this poses no limitation, and the dummy electrode may not be provided instead.

Figure 25:
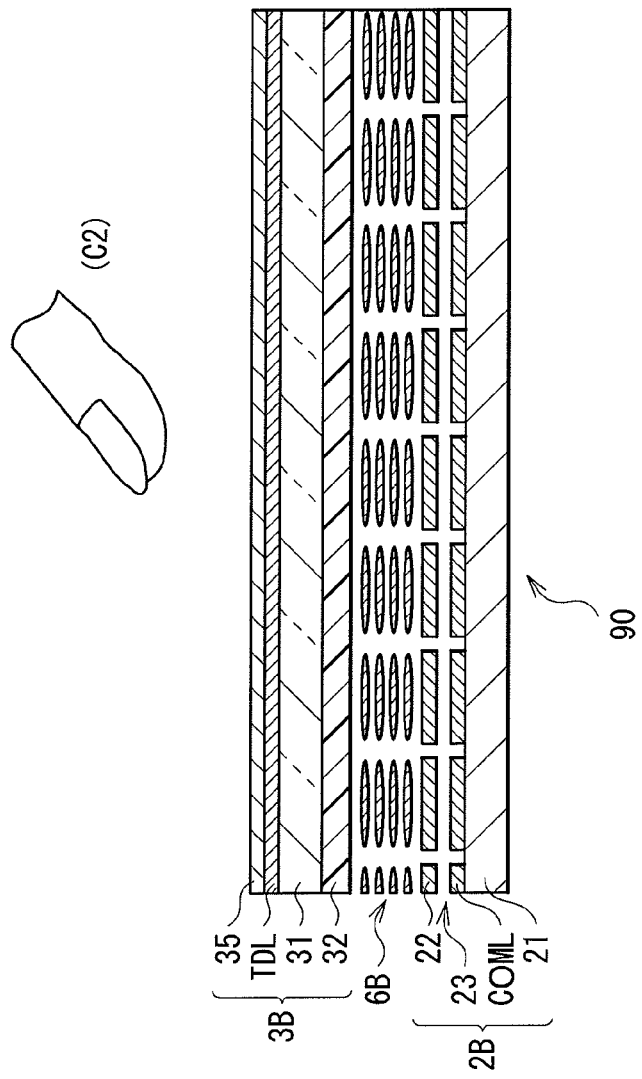
FIG. 25 is a cross-sectional diagram illustrating a schematic sectional structure of a display device with a touch detection function according to another modification of the embodiments of the present disclosure.

For example, in each of the embodiments and the like described above, the display device 10 with the touch detection function is configured by integrating the liquid-crystal display device 20 using the liquid crystal of any of various modes such as TN, VA, and ECB, with the touch detection device 30. However, instead, a liquid crystal display device employing a liquid crystal in a transverse electric mode such as FFS (Fringe Field Switching) or IPS (In-Plane Switching) may be integrated with the touch detection device. For example, when the liquid crystal of the transverse electric mode is used, a display device 90 with a touch detection function may be configured as illustrated in FIG. 25. This figure represents an example of a sectional structure of a main part in the display device 90 with the touch detection function, and illustrates a state in which a liquid crystal layer 6B is interposed between a pixel substrate 2B and an opposite substrate 3B. Names and functions of other parts are similar to those in the case of FIG. 5 and thus, the description will be omitted. In this example, unlike the case of FIG. 5, a drive electrode COML used for both display and touch detection is formed right on top of a TFT substrate 21, and forms a part of the pixel substrate 2B. A pixel electrode 22 is disposed above the drive electrode COML with an insulating layer 23 in between. In this case, all dielectrics including the liquid crystal layer 6B between the drive electrode COML and a touch detection electrode TDL contribute to the formation of a capacitive element C1.

The present disclosure contains subject matter related to that disclosed in Japanese Priority Patent Application JP 2010-184304 filed in the Japan Patent Office on Aug. 19, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display unit with a touch detection function, the display unit comprising:
   a plurality of touch detection electrodes that output a detection signal based on a variation in capacitance due to an external proximity object, each of the touch detection electrodes being formed in a predetermined electrode pattern including an electrode portion and an opening portion, the plurality of touch detection electrodes including (a) a plurality of connection parts each extending in a first direction and (b) a plurality of strip-shaped electrode parts arranged in parallel to each other, the plurality of strip-shaped electrode parts each extending in a second direction crossing the first direction, the plurality of connection parts connecting the plurality of strip-shaped electrode parts to each other in the first direction;
   a plurality of display elements formed in a layer different from a layer in which the touch detection electrodes are formed, the plurality of the display elements being arranged in the first direction of a display region of the display, the display region of the display being comprised of the display elements; and
   a plurality of dummy electrodes that are disposed in the layer in which the detection electrodes are formed, each of the dummy electrodes being formed in a predetermined dummy electrode pattern including a dummy electrode portion and a dummy opening portion, the predetermined dummy electrode pattern corresponding to a layout pattern of the display elements, the plurality of dummy electrodes including (a) a plurality of dummy connection parts each extending in the first direction and (b) a plurality of dummy strip-shaped electrode parts arranged in parallel to each other, the plurality of dummy strip-shaped electrode parts each extending in the second direction, and the plurality of dummy connection parts connecting the plurality of dummy strip-shaped electrode parts to each other in the first direction,
   wherein,
      the plurality of strip-shaped electrode parts are spaced at a pitch corresponding to a pixel pitch in the first direction of the display region,
      the plurality of strip-shape electrode parts have widths in the first direction such that each of the display regions of the plurality of display elements is substantially not overlain by the plurality of strip-shaped electrode parts,
      the plurality of dummy strip-shaped electrode parts are spaced at the pitch corresponding to the pixel pitch in the first direction of the display region, and
      the plurality of dummy strip-shape electrode parts have widths in the first direction such that each of the display regions of the plurality of display elements is substantially not overlain by the plurality of dummy strip-shaped electrode parts.

2. The display unit according to claim 1, further comprising a signal line that communicates a pixel signal to be transmitted to the display element, wherein a part of the electrode portion is arranged in a region corresponding to the signal line.

3. The display unit according to claim 2, further comprising a selection line used to select the display element which is a target of display operation, wherein a remaining part of the electrode portion is provided in a region corresponding to the selection line.

4. The display unit according to claim 1, wherein the electrode portion is provided in a region corresponding to a border between the display elements adjacent to each other.

5. The display unit according to claim 1, wherein:
   the display elements form display pixels each of which includes a red sub-element, a green sub-element, and a blue sub-element, and
      the electrode portion is provided at least in a region corresponding to a color sub-element for red light, green light or blue light, the color sub-element exhibiting a highest transmittance for the electrode portion.

6. The display unit according to claim 5, wherein the electrode portion is provided at least in a region corresponding to the red sub-element.

7. The display unit according to claim 6, wherein the electrode portion is further provided in a region corresponding to the green sub-element as well.

8. The display unit according to claim 7, wherein the electrode portion and the opening portion are provided in a region corresponding to the blue sub-element.

9. The display unit according to claim 8, wherein the opening portion is provided substantially at a center of the blue sub-element, the center representing a position in a direction along which the red sub-element, the green sub-element, and the blue sub-element are arrayed.

10. The display unit according to claim 1, further comprising a plurality of drive electrodes arranged side by side and extending in a direction intersecting the touch detection electrodes, wherein, capacitance is formed at each of intersections of the touch detection electrodes and the drive electrodes.

11. A display unit comprising:
   a plurality of detection electrodes that output a detection signal based on a variation in capacitance due to an external proximity object, each of the touch detection electrodes being formed in a predetermined electrode pattern including an electrode portion and an opening portion, and the plurality of detection electrodes including (a) a plurality of connection parts each extending in a first direction and (b) a plurality of strip-shaped electrode parts arranged in parallel to each other, the plurality of strip-shaped electrode parts each extending in a second direction crossing the first direction, and the plurality of connection parts connecting the plurality of strip-shaped electrode parts to each other in the first direction;
   a plurality of display elements formed in a layer different from a layer in which the detection electrodes are formed, the plurality of the display elements being arranged in the first direction of a display region of the display unit, the display region of the display being comprised of the display elements;
   a plurality of dummy electrodes that are disposed in the layer in which the detection electrodes are formed, each of the dummy electrodes being formed in a predetermined dummy electrode pattern including a dummy electrode portion and a dummy opening portion, the predetermined dummy electrode pattern corresponding to a layout pattern of the display elements, the plurality of dummy electrodes including (a) a plurality of dummy connection parts each extending in the first direction and (b) a plurality of dummy strip-shaped electrode parts arranged in parallel to each other, the plurality of dummy strip-shaped electrode parts each extending in the second direction, and the plurality of dummy connection parts connecting the plurality of dummy strip-shaped electrode parts to each other in the first direction, and a signal line allowing the display elements to be driven, wherein, part of the electrode portion is arranged in a region corresponding to the signal line, the plurality of strip-shaped electrode parts being spaced at a pitch corresponding to a pixel pitch in the first direction of the display region, the plurality of strip-shaped electrode parts have widths in the first direction such that each of the display regions of the plurality of display elements is substantially not overlain by the plurality of strip-shaped electrode parts, the plurality of dummy strip-shaped electrode parts are spaced at the pitch corresponding to the pixel pitch in the first direction of the display region, and the plurality of dummy strip-shape electrode parts have widths in the first direction such that each of the display regions of the plurality of display elements is substantially not overlain by the plurality of dummy strip-shaped electrode parts.

12. The display unit according to claim 11, wherein part of the dummy electrode portion is provided in a region corresponding to the signal line.

13. An electronic device comprising:
a display unit with a touch detection function; and
a control section performing operation control with use of the display unit,
wherein, the display unit includes
(a) a plurality of touch detection electrodes that output a detection signal based on a variation in capacitance due to an external proximity object, each of the touch detection electrodes being formed in a predetermined electrode pattern including an electrode portion and an opening portion, and the plurality of touch detection electrodes including (1) a plurality of connection parts each extending in a first direction and (2) a plurality of strip-shaped electrode parts arranged in parallel to each other, the plurality of strip-shaped electrode parts each extending in a second direction crossing the first direction, and the plurality of connection parts connecting the plurality of strip-shaped electrode parts to each other in the first direction;

(b) a plurality of display elements formed in a layer different from a layer in which the touch detection electrodes are formed, the plurality of the display elements being arranged in the first direction of a display region of the display unit the display region of the display being comprised of the display elements; and (c) a plurality of dummy electrodes that are disposed in the layer in which the detection electrodes are formed, each of the dummy electrodes being formed in a predetermined dummy electrode pattern including a dummy electrode portion and a dummy opening portion, the predetermined dummy electrode pattern corresponding to a layout pattern of the display elements, the plurality of dummy electrodes including (1) a plurality of dummy connection parts each extending in the first direction and (2) a plurality of dummy strip-shaped electrode parts arranged in parallel to each other, the plurality of dummy strip-shaped electrode parts each extending in the second direction, and the plurality of dummy connection parts connecting the plurality of dummy strip-shaped electrode parts to each other in the first direction, wherein, the plurality of strip-shaped electrode parts are spaced at a pitch corresponding to a pixel pitch in the first direction of the display region, the plurality of strip-shape electrode parts have widths in the first direction such that each of the display regions of the plurality of display elements is substantially not overlain by the plurality of strip-shaped electrode parts, the plurality of dummy strip-shaped electrode parts are spaced at the pitch corresponding to the pixel pitch in the first direction of the display region, and the plurality of dummy strip-shape electrode parts have widths in the first direction such that each of the display regions of the plurality of display elements is substantially not overlain by the plurality of dummy strip-shaped electrode parts.

14. The display unit according to claim 1, wherein the plurality of strip-shaped electrode parts are disposed at the positions corresponding to a pixel line and the plurality of connection parts are disposed at the positions corresponding to a scanning line.

* * * * *